(12) United States Patent
Matsumura et al.

(10) Patent No.: US 11,848,891 B2
(45) Date of Patent: Dec. 19, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 1 day.

(21) Appl. No.: 16/962,687

(22) PCT Filed: Jan. 19, 2018

(86) PCT No.: PCT/JP2018/001685
§ 371 (c)(1),
(2) Date: Jul. 16, 2020

(87) PCT Pub. No.: WO2019/142340
PCT Pub. Date: Jul. 25, 2019

(65) Prior Publication Data
US 2020/0366446 A1    Nov. 19, 2020

(51) Int. Cl.
*H04L 5/00*        (2006.01)
*H04W 72/1273*     (2023.01)
*H04W 72/20*       (2023.01)

(52) U.S. Cl.
CPC .......... *H04L 5/0055* (2013.01); *H04L 5/0007* (2013.01); *H04W 72/1273* (2013.01); *H04W 72/20* (2023.01)

(58) Field of Classification Search
CPC ... H04L 5/0055; H04L 5/0007; H04L 5/0094; H04W 72/1273; H04W 72/1278; H04W 72/0413
See application file for complete search history.

(56) References Cited

U.S. PATENT DOCUMENTS

2012/0300741 A1*  11/2012  Han ..................... H04L 1/0073
                                                370/329
2013/0182676 A1    7/2013  Lee et al.
(Continued)

FOREIGN PATENT DOCUMENTS

| EP | 2 538 601 A2 | 12/2012 |
| JP | 2013-529016 A | 7/2013 |
| JP | 2015-126309 A | 7/2015 |

OTHER PUBLICATIONS

International Search Report issued in PCT/JP2018/001685 dated Apr. 10, 2018 (1 page).
(Continued)

*Primary Examiner* — Sharmin Chowdhury
(74) *Attorney, Agent, or Firm* — Osha Bergman Watanabe & Burton LLP

(57) ABSTRACT

A user terminal according to the present invention includes: a transmission section that transmits Uplink Control Information (UCI) by using an uplink control channel; and a control section that, when one or more resource sets each including one or more resources for the uplink control channel are configured, determines a resource used for transmission of the UCI based on a given field value in Downlink Control Information (DCI) and implicit indication information from a resource set selected based on a number of bits of the UCI.

5 Claims, 20 Drawing Sheets

| GIVEN FIELD VALUE IN DCI | PUCCH RESOURCE |
|---|---|
| 00 | PUCCH RESOURCE #0 |
| 01 | PUCCH RESOURCE #1 |
| 10 | PUCCH RESOURCE #2 |
| 11 | PUCCH RESOURCE #3 |

| GIVEN FIELD VALUE IN DCI | IMPLICIT INDICATION INFORMATION | PUCCH RESOURCE |
|---|---|---|
| 00 | 0 | PUCCH RESOURCE #0 |
|    | 1 | PUCCH RESOURCE #1 |
| 01 | 0 | PUCCH RESOURCE #2 |
|    | 1 | PUCCH RESOURCE #3 |
| 10 | 0 | PUCCH RESOURCE #4 |
|    | 1 | PUCCH RESOURCE #5 |
| 11 | 0 | PUCCH RESOURCE #6 |
|    | 1 | PUCCH RESOURCE #7 |

(56) References Cited

U.S. PATENT DOCUMENTS

| | | | |
|---|---|---|---|
| 2013/0195066 A1 | 8/2013 | Lee et al. | |
| 2017/0019237 A1 | 1/2017 | Yang et al. | |
| 2018/0248664 A1 | 8/2018 | Takeda et al. | |
| 2018/0359745 A1* | 12/2018 | Yeo | H04L 5/0035 |
| 2018/0368139 A1 | 12/2018 | Han et al. | |
| 2019/0036653 A1* | 1/2019 | Lunttila | H04L 1/1861 |
| 2019/0150181 A1* | 5/2019 | Kim | H04L 1/1858 370/329 |
| 2020/0187200 A1 | 6/2020 | Han et al. | |

OTHER PUBLICATIONS

Written Opinion of the International Searching Authority issued in PCT/JP2018/001685 dated Apr. 10, 2018 (3 pages).

Motorola Mobility, Lenovo; "PUCCH resource allocation"; 3GPP TSG RAN WG1 #91, R1-1720926; Reno, USA; Nov. 27-Dec. 1, 2017 (10 pages).

Ericsson; "On PUCCH Resource Allocation"; 3GPP TSG-RAN WG1 Meeting RAN1 #91, R1-1721006; Reno, Nevada, United States; Nov. 27-Dec. 1, 2017 (11 pages).

Nokia, Nokia Shanghai Bell; "PUCCH Resource Allocation"; 3GPP TSG-RAN WG1 #91, R1-1720014; Reno, Nevada, USA; Nov. 27-Dec. 1, 2017 (12 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Extended European Search Report in counterpart European Application No. 18 90 1408.7 dated Aug. 16, 2021 (11 pages).

Office Action issued in the counterpart Japanese Patent Application No. 2019-565670, dated Feb. 8, 2022 (6 pages).

Office Action issued in the counterpart European Patent Application No. 18901408.7, dated Jun. 14, 2023 (7 pages).

* cited by examiner

FIG. 2A

| GIVEN FIELD VALUE IN DCI | PUCCH RESOURCE |
|---|---|
| 00 | PUCCH RESOURCE #0 |
| 01 | PUCCH RESOURCE #1 |
| 10 | PUCCH RESOURCE #2 |
| 11 | PUCCH RESOURCE #3 |

FIG. 2B

| GIVEN FIELD VALUE IN DCI | IMPLICIT INDICATION INFORMATION | PUCCH RESOURCE |
|---|---|---|
| 00 | 0 | PUCCH RESOURCE #0 |
| 00 | 1 | PUCCH RESOURCE #1 |
| 01 | 0 | PUCCH RESOURCE #2 |
| 01 | 1 | PUCCH RESOURCE #3 |
| 10 | 0 | PUCCH RESOURCE #4 |
| 10 | 1 | PUCCH RESOURCE #5 |
| 11 | 0 | PUCCH RESOURCE #6 |
| 11 | 1 | PUCCH RESOURCE #7 |

| DMRS TYPE | IMPLICIT INDICATION INFORMATION |
|---|---|
| TYPE 1 | 0 |
| TYPE 2 | 1 |

FIG. 5A

| POSITION INFORMATION OF ADDITIONAL DMRS | IMPLICIT INDICATION INFORMATION |
|---|---|
| pos0 OR pos1 | 0 |
| pos2 OR pos3 | 1 |

FIG. 5B

| HARD-ACK CODEBOOK TYPE | IMPLICIT INDICATION INFORMATION |
|---|---|
| TYPE 1 | 0 |
| TYPE 2 | 1 |

| CELL TO WHICH PDSCH IS SCHEDULED | IMPLICIT INDICATION INFORMATION |
|---|---|
| ONLY PCell | 0 |
| PCell + ONE OR MORE SCells | 1 |

FIG. 7B

| UCI PAYLOAD SIZE (bits) | IMPLICIT INDICATION INFORMATION |
|---|---|
| EVEN NUMBER | 0 |
| ODD NUMBER | 1 |

| GIVEN FIELD IN DCI TRANSMITTED BY GIVEN CELL | IMPLICIT INDICATION INFORMATION |
|---|---|
| 00 | 0 |
| 01 | 1 |
| 10 | Reserved |
| 11 | Reserved |

FIRST DCI (FIRST PDCCH)

| FIELD NAME OF DCI | VALUE |
|---|---|
| ... | ... |
| PUCCH RESOURCE INDICATOR | x1, x2 ← FIRST FIELD VALUE (EXPLICIT INDICATION INFORMATION) |
| TPC COMMAND | y1, y2 ← SECOND FIELD VALUE |
| ... | ... |

FIG. 9B

SECOND DCI (FIRST PDCCH)

| FIELD NAME OF DCI | VALUE |
|---|---|
| ... | ... |
| PUCCH RESOURCE INDICATOR | x1, x2 ← SECOND FIELD VALUE |
| TPC COMMAND | y1, y2 ← FIRST FIELD VALUE (EXPLICIT INDICATION INFORMATION) |
| ... | ... |

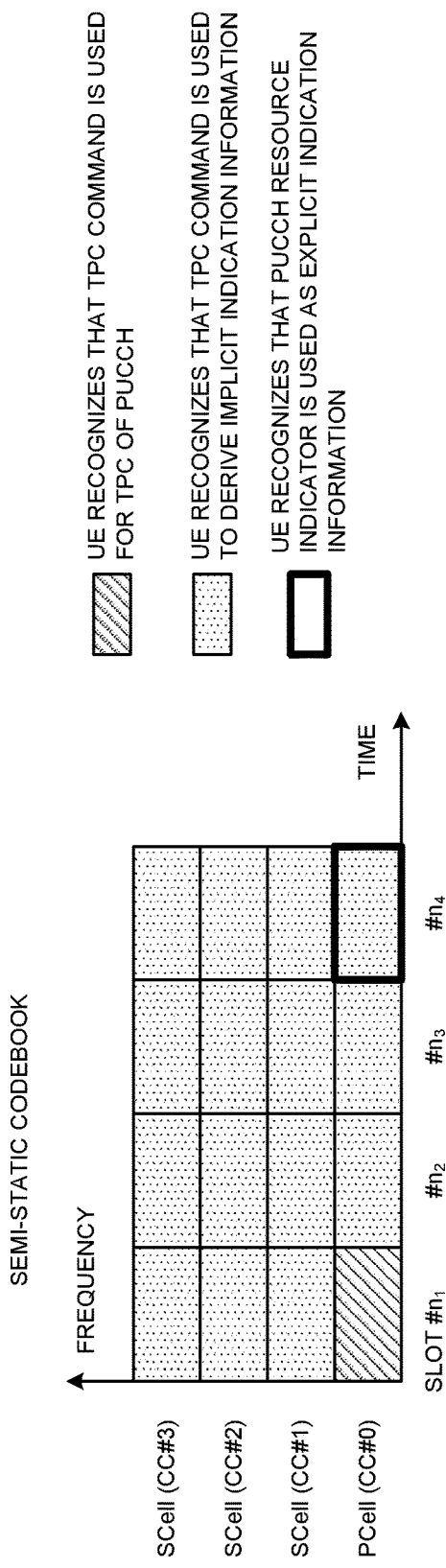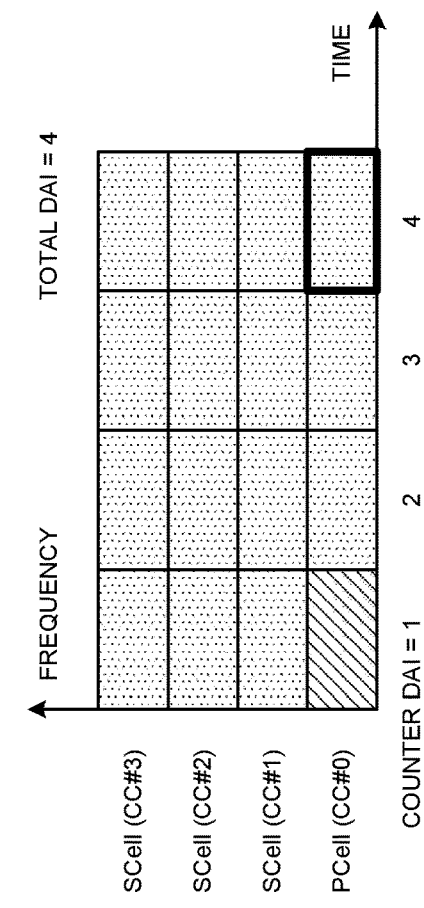

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as, for example, LTE Advanced (LTE-A), Future Radio Access (FRA), 5G; 5G+ (plus), New RAT (NR), and LTE Rel. 14 and 15~) have been also studied.

Legacy LTE systems (e.g., LTE Rel. 8 to 13) perform communication on Downlink (DL) and/or Uplink (UL) by using subframes (also referred to as, for example, Transmission Time Intervals (TTIs)) of 1 ms. The subframe is a transmission time unit of 1 channel-coded data packet, and is a processing unit of scheduling, link adaptation and retransmission control (HARQ: Hybrid Automatic Repeat reQuest).

Furthermore, in the legacy LTE systems (e.g., LTE Rel. 8 to 13), a user terminal transmits Uplink Control Information (UCI) by using an uplink control channel (e.g., PUCCH: Physical Uplink Control Channel) or an uplink shared channel (e.g., PUSCH: Physical Uplink Shared Channel). A configuration (format) of the uplink control channel will be referred to as, for example, a PUCCH Format.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied for future radio communication systems (e.g., LTE Rel. 15 and subsequent releases, 5G 5G+ and NR) to, when transmitting UCI by using an uplink control channel (e.g., PUCCH), determine a resource (e.g., PUCCH resource) for the uplink control channel based on a higher layer signaling and a given field value in Downlink Control Information (DCI).

More specifically, the future radio communication systems assume that, when one or more sets (PUCCH resource sets) each including one or more PUCCH resources are notified (configured) to a user terminal by the higher layer signaling, the user terminal determines the PUCCH resource used for transmission of the UCI based on the given field value in the DCI from the PUCCH resource set selected based on a payload size (the number of bits) of the UCI.

However, when the PUCCH resource set selected based on the UCI payload size includes a larger number of (e.g., M>4 in a case where the given field in the DCI is 2 bits) PUCCH resources than a number that can be indicated by a given field in the DCI, there is a risk that the user terminal cannot appropriately determine the PUCCH resources used for transmission of the UCI.

The present invention has been made in light of this point, and one of objects of the present invention is to provide a user terminal and a radio communication method that can appropriately determine a PUCCH resource used for transmission of UCI.

Solution to Problem

One aspect of a user terminal according to the present invention includes: a transmission section that transmits Uplink Control Information (UCI) by using an uplink control channel; and a control section that, when one or more resource sets each including one or more resources for the uplink control channel are configured, determines a resource used for transmission of the UCI based on a given field value in Downlink Control Information (DCI) and implicit indication information from a resource set selected based on a number of bits of the UCI.

Advantageous Effects of Invention

According to the present invention, it is possible to appropriately determine a PUCCH resource used for transmission of UCI.

BRIEF DESCRIPTION OF DRAWINGS

FIGS. 2A and 2B are diagrams illustrating one example of a given field value in DCI.

FIGS. 5A and 5B are diagrams illustrating one example of a third deriving example of the implicit indication information according to the first aspect.

FIG. 6 is a diagram illustrating another example of the third deriving example of the implicit indication information according to the first aspect.

FIGS. 7A and 7B are diagrams illustrating one example of a fourth deriving example of the implicit indication information according to the first aspect.

FIG. 8 is a diagram illustrating another example of the fourth deriving example of the implicit indication information according to the first aspect.

FIGS. 9A and 9B are diagrams illustrating one example of first and second DCI according to a third aspect.

FIGS. 14A and 14B are diagrams illustrating a fourth determination example of a PUCCH resource according to the third aspect.

DESCRIPTION OF EMBODIMENTS

Figure 1:
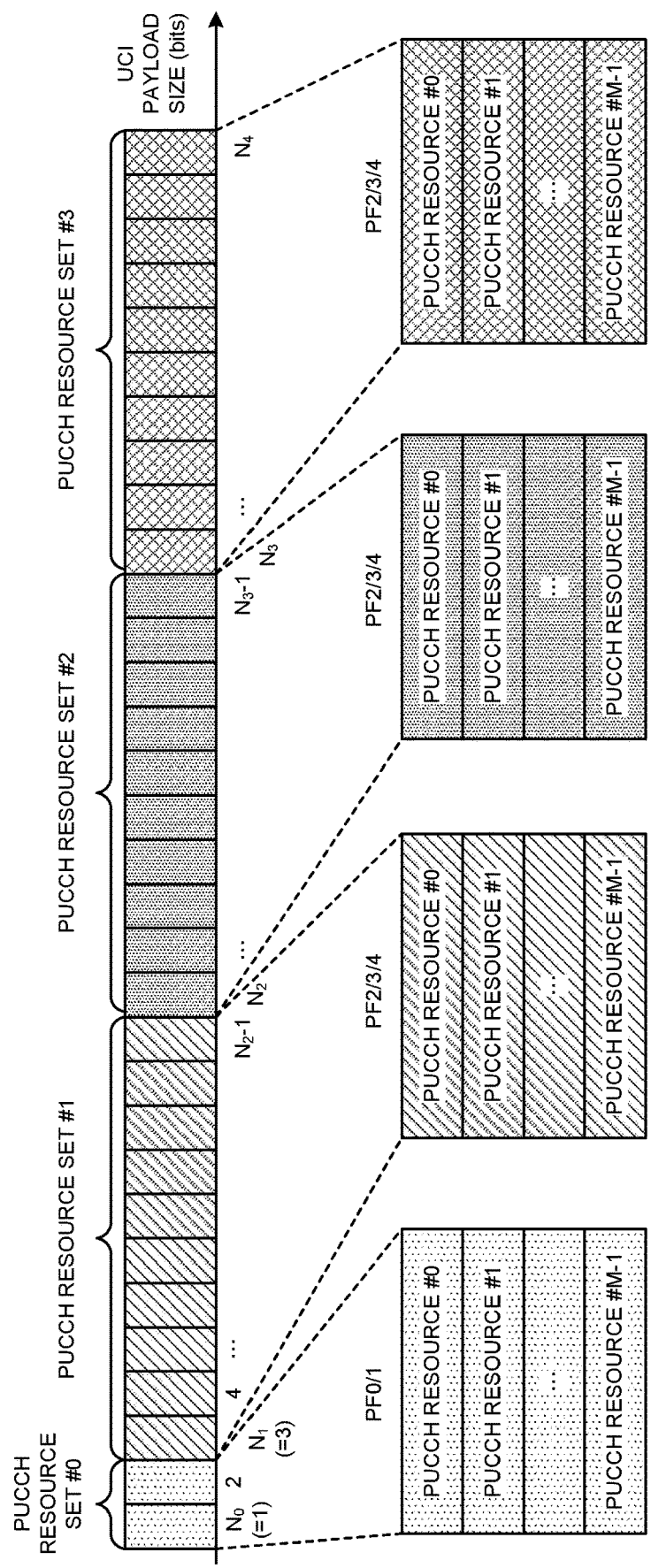
FIG. 1 is a diagram illustrating one example of allocation of PUCCH resources.

For a future radio communication system (e.g., LTE Rel. 15~, 5G or NR), a configuration (also referred to as, for example, a format or a PUCCH Format (PF)) for an uplink control channel (e.g., PUCCH) used for transmission of UCI has been studied. For example, it has been studied for LTE Rel. 15 to support 5 types of PFs 0 to 4. In this regard, names of PFs described below are only exemplary, and different names may be used.

For example, the PFs 0 and 1 are PFs that are used for transmission of UCI (e.g., transmission acknowledgement information (also referred to as, for example, HARQ-ACK: Hybrid Automatic Repeat reQuest-Acknowledge, ACK or NACK)) up to 2 bits. The PF 0 can be allocated to 1 or 2 symbols, and therefore will be also referred to as, for example, a short PUCCH or a sequence-based short PUCCH. On the other hand, the PF 1 can be allocated to 4 to 14 symbols, and therefore will be also referred to as, for example, a long PUCCH. According to the PF 1, a plurality of user terminals may be subjected to Code Division Multiplexing (CDM) in an identical PRB by time domain block-wise spreading that uses at least one of a CS and an OCC.

The PFs 2 to 4 are PFs that are used for transmission of UCI (e.g., Channel State Information (CSI) (or CSI, and HARQ-ACK and/or a Scheduling Request (SR))) more than 2 bits. The PF 2 can be allocated to 1 or 2 symbols, and therefore will be also referred to as, for example, a short PUCCH. On the other hand, the PFs 3 and 4 can be allocated to 4 to 14 symbols, and therefore will be also referred to as, for example, a long PUCCH. According to the PF 3, a plurality of user terminals may be subjected to CDM by using pre-DFT (frequency domain) block-wise spreading.

A resource (e.g., PUCCH resource) used for transmission of the uplink control channel is allocated by using a higher layer signaling and/or Downlink Control Information (DCI). In this regard, the higher layer signaling only needs to be at least one of, for example, a Radio Resource Control (RRC) signaling, system information (e.g., at least one of RMSI: Remaining Minimum System Information, OSI: Other System Information, an MIB: Master Information Block and an SIB: System Information Block), and broadcast information (PBCH: Physical Broadcast Channel).

More specifically, one or more sets (PUCCH resource sets) each including one or more PUCCH resources are notified (configured) to a user terminal by a higher layer signaling. For example, K (e.g., 1≤K≤4) PUCCH resource sets may be notified to the user terminal from a radio base station. Each PUCCH resource set may include M (e.g., 4≤K≤8) PUCCH resources.

The user terminal may determine a single PUCCH resource set from the K configured PUCCH resource sets based on a payload size of UCI (UCI payload size). The UCI payload size may be the number of bits of UCI that does not include a Cyclic Redundancy Check (CRC) bit.

The user terminal may determine a PUCCH resource used for transmission of UCI based on at least one of DCI and implicit information (also referred to as, for example, implicit indication information or an implicit index) from the M PUCCH resources included in the determined PUCCH resource set.

FIG. 1 is a diagram illustrating one example of allocation of PUCCH resources. FIG. 1 illustrates one example where K=4 holds, and four PUCCH resource sets #0 to #3 are configured from the radio base station to the user terminal by a higher layer signaling. Furthermore, the PUCCH resource sets #0 to #3 each include M (e.g., 4≤M≤8) PUCCH resources #0 to #M−1. In addition, the number of PUCCH resources included in each PUCCH resource set may be identical or may be different.

In FIG. 1, each PUCCH resource configured to the user terminal may include a value of at least one of following parameters (also referred to as, for example, fields or information). In addition, a range of a value that can be taken per PUCCH format may be defined for each parameter.

A symbol (start symbol) from which PUCCH allocation is started

The number of symbols (a duration to be allocated to the PUCCH) to be allocated to a PUCCH in a slot An index of a resource block (Physical Resource Block (PRB)) from which PUCCH allocation is started.

The number of PRBs to be allocated to a PUCCH

Whether or not to enable frequency hopping with respect to a PUCCH

A frequency resource of a second hop in a case where frequency hopping is enabled, and an index of initial Cyclic Shift (CS)

An index of an orthogonal spreading code (e.g., OCC: Orthogonal Cover Code) in the time domain or the length of the OCC (also referred to as, for example, an OCC length or a spreading factor) used for pre-Discrete Fourier Transform (DFT) block-wise spreading An index of the OCC used for post-DFT block-wise spreading When the PUCCH resource sets #0 to #3 are configured to the user terminal as illustrated in FIG. 1, the user terminal selects one of the PUCCH resource sets based on a UCI payload size.

When, for example, the UCI payload size is 1 or 2 bits, the PUCCH resource set #0 is selected. Furthermore, when the UCI payload size is 3 bits or more and $N_2-1$ bits or less, the PUCCH resource set #1 is selected. Furthermore, when the UCI payload size is $N_2$ bits or more and $N_3-1$ bits or less, the PUCCH resource set #2 is selected. Similarly, when the UCI payload size is $N_3$ bits or more and $N_3-1$ bits or less, the PUCCH resource set #3 is selected.

Thus, a range of the UCI payload size for selecting a PUCCH resource set #i (i=0, . . . , K−1) is indicated as $N_i$ bits or more and $N_{i+1}-1$ bits or less (i.e., $\{N_i, N_{i+1}-1\}$ bits).

In this regard, start positions (the numbers of start bits) $N_0$ and $N_i$ of UCI payload sizes for the PUCCH resource sets #0 and #1 may be 1 and 3, respectively. Thus, the PUCCH resource set #0 is selected when UCI up to 2 bits is transmitted. Therefore, the PUCCH resource set #0 may include the PUCCH resources #0 to #M−1 for at least one of the PF 0 and the PF 1. On the other hand, one of the PUCCH resource sets #1 to #3 is selected when UCI more than 2 bits is transmitted. Therefore, the PUCCH resource sets #1 to #3 may include the PUCCH resources #0 to #M−1 for at least one of the PF 2, the PF 3 and the PF 1, respectively.

In a case of i=2, . . . , K−1, information (start position information) indicating a start position ($N_i$) of a UCI payload size for the PUCCH resource set #i may be notified (configured) to the user terminal by using a higher layer signaling. The start position ($N_i$) may be user terminal-specific. For example, the start position ($N_i$) may be configured to a value (e.g., a multiple of 4) in a range equal to or more than 4 bits and equal to or less than 256 bits. For example, in FIG. 1, information indicating start positions ($N_2$ and $N_3$) of UCI payload sizes for the PUCCH resource sets #2 and #3 is each notified to the user terminal by a higher layer signaling (e.g., user-specific RRC signaling).

A maximum payload size of UCI of each PUCCH resource set is given according to $N_K-1$. $N_K$ may be explicitly notified (configured) to the user terminal by a higher layer signaling and/or DCI, or may be implicitly derived. For example, in FIG. 1, $N_0=1$ and $N_i=3$ may be specified by a specification, and $N_2$ and $N_3$ may be notified by a higher layer signaling. Furthermore, $N_4$ may be specified by the specification (e.g., $N_4=1000$).

In the case illustrated in FIG. 1, the user terminal can determine a single PUCCH resource used for transmission of UCI based on a given field value in DCI from the PUCCH resources #0 to #M−1 included in the PUCCH resource set selected based on the UCI payload size. When the number of bits of the given field is 2 bits, it is possible to indicate 4 types of PUCCH resources.

On the other hand, each PUCCH resource set is assumed to include more than 4 types of PUCCH resources. Hence, when a PUCCH resource set selected based on a UCI payload size includes a greater number (e.g., M>4 in a case where the given field in the DCI is 2 bits) of PUCCH resources than the number that can be indicated by the given field in the DCI, there is a risk that the user terminal cannot appropriately determine (specify) a PUCCH resource used for transmission of the UCI.

Hence, the inventors of the present invention have studied a method for appropriately determining the PUCCH resource used for transmission of the UCI from the M PUCCH resources included in the PUCCH resource set selected based on the UCI payload size, and reached the present invention.

The present embodiment will be described in detail below. In this regard, in the following description, each PUCCH resource in each PUCCH resource set is explicitly notified (configured) from the radio base station to the user terminal by a higher layer signaling, yet is not limited to this. For example, at least one PUCCH resource in at least one PUCCH resource set may be defined in advance by the specification, or may be derived by the user terminal.

Furthermore, in one example in the following description, the K (e.g., 1≤K≤4) PUCCH resource sets are configured to the user terminal, and each PUCCH resource set includes M (e.g., 1≤K≤8) PUCCH resource sets. However, values of K and M are not limited to these.

Furthermore, in the following description, the number of bits (x) of the given field in the DCI used to determine PUCCH resources is 2, yet is not limited to this, and only needs to be x≥1. Each following aspect is applicable to a case where a single PUCCH resource set selected from the K PUCCH resource sets based on the UCI payload size includes PUCCH resources the number of which is larger than an Xth power of 2 (i.e., in a case of M>2^X).

Furthermore, the x-bit given field may be referred to as, for example, a PUCCH resource indicator field, an ACK/NACK Resource Indicator (ARI), an ACK/NACK Resource Offset (ARO) or a TPC command field.

Furthermore, the UCI may include at least one of transmission acknowledgement information (also referred to as, for example, retransmission control information, Hybrid Automatic Repeat reQuest-Acknowledge (HARQ-ACK) or Acknowledge/Non-Acknowledge (ACK/NACK)) for a downlink shared channel (e.g., PDSCH: Physical Downlink Shared Channel), a Scheduling Request (SR) of an uplink shared channel (e.g., PUSCH), and Channel State Information (CSI).

(First Aspect)

According to the first aspect, when the number of PUCCH resources (M) included in a PUCCH resource set selected based on a UCI payload size is larger than 4, a user terminal determines a PUCCH resource used for transmission of UCI from M PUCCH resources based on a given field value in DCI and implicit indication information.

FIG. 2 is a diagram illustrating one example of the given field value in the DCI. FIG. 2A illustrates one example of a case of M≤4 (M=4 in this case), and FIG. 2B illustrates one example of a case of M>4 (M=8 in this case). As illustrated in, for example, FIG. 2A, in a case of M≤4, each value of the given field in the DCI may indicate one PUCCH resource. Hence, the user terminal can uniquely determine a PUCCH resource based on the given field value in the DCI.

On the other hand, as illustrated in, for example, FIG. 2B, in a case of M>4, each value of the given field in the DCI may indicate a plurality of PUCCH resources (2 PUCCH resources in this case). The user terminal may determine one of a plurality of PUCCH resources indicated by the given field value in the DCI based on implicit indication information (e.g., 1 bit). In addition, in a case of 4<M<8, part of values of the given field may be associated with one PUCCH resource.

<Deriving of Implicit Indication Information>

In this regard, implicit indication information (e.g., "0" or "1" in FIG. 2B) can be derived based on at least one of pieces of following information (1) to (8). At least one of pieces of following information (1) to (8) may be notified to a user terminal by at least one of a higher layer signaling and DCI, or may be derived by the user terminal.

(1) An index (e.g., lowest index) of a control resource element on which a downlink control channel (e.g., PDCCH: Physical Downlink Control Channel that will be referred to as a PDCCH below) is mapped. The control resource element only needs to be, for example, a Control Channel Element (CCE), a CCE group including one or more CCEs, a Resource Element Group (REG) including one or more Resource Elements (REs), or one or more REG bundles (REG groups).

When there are a plurality of PDCCHs in a time domain and/or a frequency domain, the user terminal may determine (select) a PDCCH used to derive the above implicit indication information according to a given rule. When, for example, a plurality of PDCCHs are transmitted in each of a plurality of slots (also referred to as, for example, Transmission Timer Intervals (TTIs)), a PDCCH in a latest slot may be selected.

Furthermore, when a plurality of Component Carriers (CCs) (also referred to as, for example, cells, serving cells or carriers) are configured to the user terminal (in a case of, for example, Carrier Aggregation (CA) or Dual Connectivity (DC)), a PDCCH of a CC having a given index (e.g., lowest or highest index) may be selected.

(2) An index of a Control Resource Set (CORESET) associated with a PDCCH. In this regard, the CORESET is a resource domain to which a PDCCH is allocated, and may be configured to include a given frequency domain resource and time domain resource (e.g., 1 or 2 OFDM symbols). The PDCCH (or DCI) is mapped on the control resource element in the CORESET. In this regard, when there are a plurality of PDCCHs in the time domain and/or the frequency domain, the PDCCH may be selected according to the rule described in (1).

(3) An index of a search space associated with a PDCCH. In this regard, when there are a plurality of PDCCHs in the time domain and/or the frequency domain, a PDCCH may be selected according to the rule described in (1).

(4) For example, a state of a Transmission Configuration Indicator (TCI) (TCI-state) associated with a PDCCH. In this regard, the TCI-state may indicate (include) information related to Quasi-Co-Location (QCL) of the PDCCH.

Furthermore, QCL is an indicator that indicates a statistical property of a channel. This means that it is possible to assume that, when, for example, a certain signal and another signal have a QCL relationship, parameters of at least one of doppler shift, doppler spread, average delay, delay spread and a spatial parameter (e.g., spatial Rx parameter) are identical between a plurality of these different signals. A plurality of QCL types may be provided according to types of parameters that can be assumed to be identical.

For example, the TCI-state associated with the PDCCH may indicate at least one of, for example, a Downlink Reference Signal (DL-RS) that has a QCL relationship with the PDCCH (or an antenna port of a Demodulation Reference Signal (DMRS) for the PDCCH), and a QCL type. In this regard, when there are a plurality of PDCCHs in the time domain and/or the frequency domain, the PDCCH may be selected according to the rule described in (1).

(5) The number of bits of HARQ-ACK for a PDSCH.

(6) A given field value (e.g., a value of a Transmission Power Control (TPC) command field) in DCI used to schedule a downlink shared channel (e.g., PDSCH) of a Secondary Cell (SCell).

(7) Configuration Information of a Demodulation Reference Signal (DMRS). In this regard, the configuration information of the DMRS may include information (also referred to as, for example, a PDSCH mapping type A or B or a DMRS type A or B) indicating a position of a DMRS for a PDSCH.

(8) A Payload of UCI.

More specifically, the above implicit indication information (e.g., "0" or "1" in FIG. 2B) may be derived based on a modulo operation result of at least one of pieces of the above information (1) to (8) (first deriving example). Furthermore, the above implicit indication information may be derived based on at least one of pieces of the above information (1) to (8) and a predetermined segment (also referred to as, for example, a partial domain or a part) (second deriving example). Furthermore, the above implicit indication information may be derived by using another method based on at least one of pieces of the above information (1) to (8) (third and fourth deriving examples).

First Deriving Example

The first deriving example will describe a deriving example of the above implicit indication information that uses a modulo operation. For example, the user terminal may derive the above implicit indication information based on a result of the modulo operation that uses (1) the above lowest index of the control resource element (e.g., CCE).

More specifically, when a single CC is configured to the user terminal, the user terminal may derive the above implicit indication information (r) by the modulation operation that is based on the lowest index of a CCE (C) on which a lastly received PDCCH is mapped, an aggregation level (L), and the number of PUCCH resources (that is M and is, for example, M=2 in FIG. 2B and will be also referred to as, for example, the number of PUCCH resources in a subset) associated with an identical value of a given field in DCI. For example, following equation (1) can be used for the modulo operation.

[Mathematical 1]

$$r = \mod\left(\frac{C}{L}, M\right) \quad \text{Equation (1)}$$

Furthermore, when a plurality of CCs are configured to the user terminal, the above lowest index of the CCE (C) may be a lowest index of a CCE on which a PDCCH lastly received in a given CC (e.g., a CC of a lowest or highest index) is mapped.

In the first deriving example, when the user terminal fails detecting a latest PDCCH, the user terminal derives the above implicit indication information based on the lowest index of the CCE (C) on which a previous PDCCH of the latest PDCCH is mapped. In this case, a radio base station may blind-detect that a PUCCH resource is determined based on the lowest index of the CCE (C) on which the previous PDCCH is mapped, and perform reception processing (e.g., at least one of demapping, demodulation and decoding) on UCI based on the PUCCH resource.

In addition, the first deriving example has described the modulo operation based on (1) the above lowest index of the CCE, yet is not limited to this. In the first deriving example, the above implicit indication information may be derived by the modulo operation that uses one of the above (2) CORESET index, (3) search space index, (4) TCI-state and (5) number of bits of HARQ-ACK, and the number of PUCCH resources (that is M such as M=2 in FIG. 2B) associated with an identical given field value in DCI.

Second Deriving Example

The second deriving example will describe a deriving example of the above implicit indication information that uses a predetermined segment.

Figure 3A:
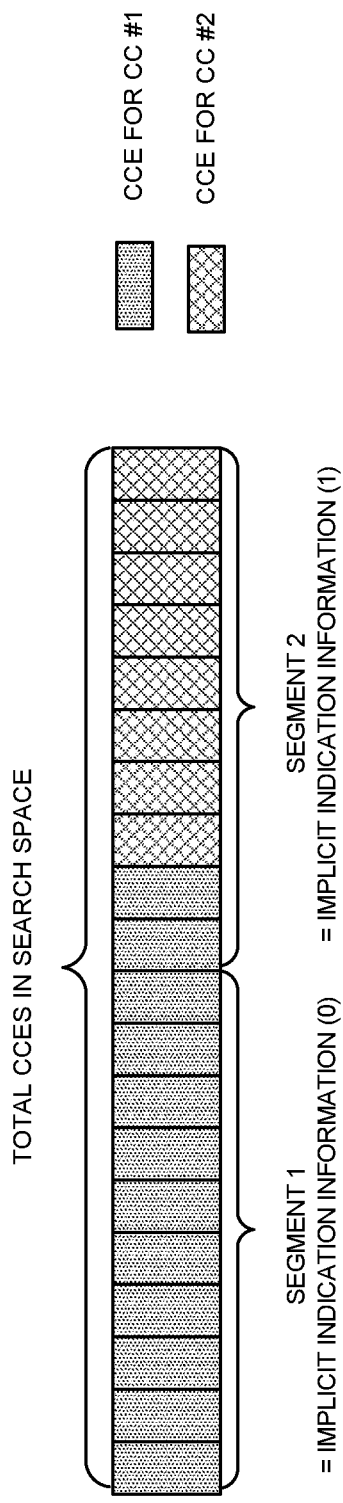
FIGS. 3A and 3B are diagrams illustrating one example of a second deriving example of implicit indication information according to a first aspect.

FIG. 3 is a diagram illustrating one example of the second deriving example of the implicit indication information according to the first aspect. As illustrated in FIG. 3A, total CCEs in a search space may be segmented into X segments. In this regard, the number of segments (X) may be configured equally to the number of PUCCH resources (2 in FIG. 2B) associated with an identical value of a given field in DCI.

Each segment size is determined based on the total number of CCEs in the search space and X. More specifically, each segment size may be calculated by operating the total number of CCEs in the search space/X by a ceiling function or a floor function. In, for example, FIG. 3A, 20 CCEs that are the total number of CCEs in the search space are segmented into 2 segments, and each segment includes 10 CCEs.

In FIG. 3A, the user terminal may derive the above implicit indication information based on (1) the above lowest index of the CCE on which the PDCCH is mapped, and the predetermined segment. More specifically, the user terminal may derive the implicit indication information according to which segment the lowest index of the CCE belongs to. When, for example, the lowest index belongs to a segment 1, the implicit indication information "0" may be derived, and, when the lowest index belongs to a segment 2, the implicit indication information "1" may be derived.

Figure 3B:
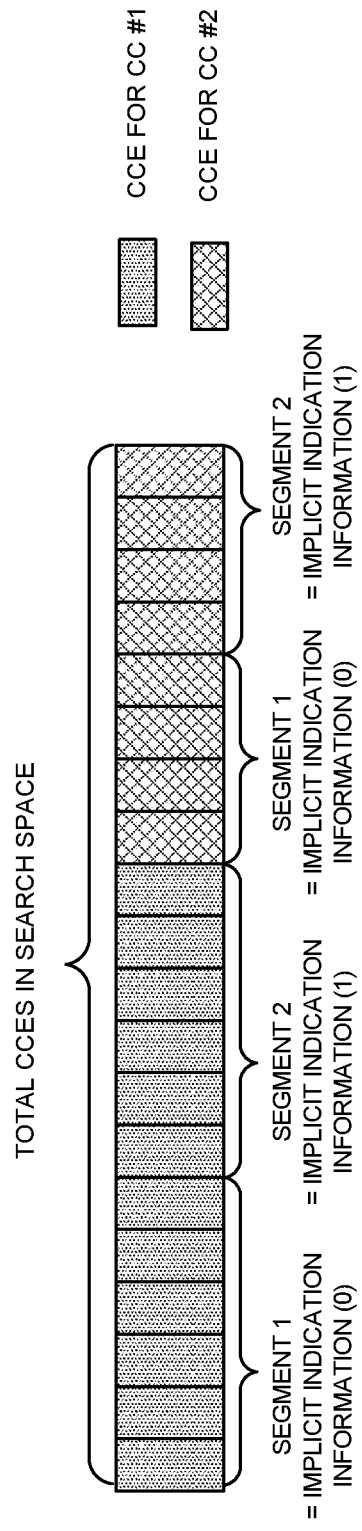

FIG. 3B illustrates a case where X=2 holds, and two PUCCH resource sets are configured to the same UCI payload. In this case, as illustrated in FIG. 3B, a CCE of each CC may be segmented into X segments. Each segment size of each CC may be calculated by operating the number of CCEs of a corresponding CC in a search space/X by a ceiling function or a floor function. Consequently, even when the number of CCEs of a CC #1 and the number of CCEs of a CC #2 are different, implicit indication information (0) and implicit indication information (1) are output at the same rate, so that it is possible to more flexibly notify a PUCCH resource.

Figure 4:
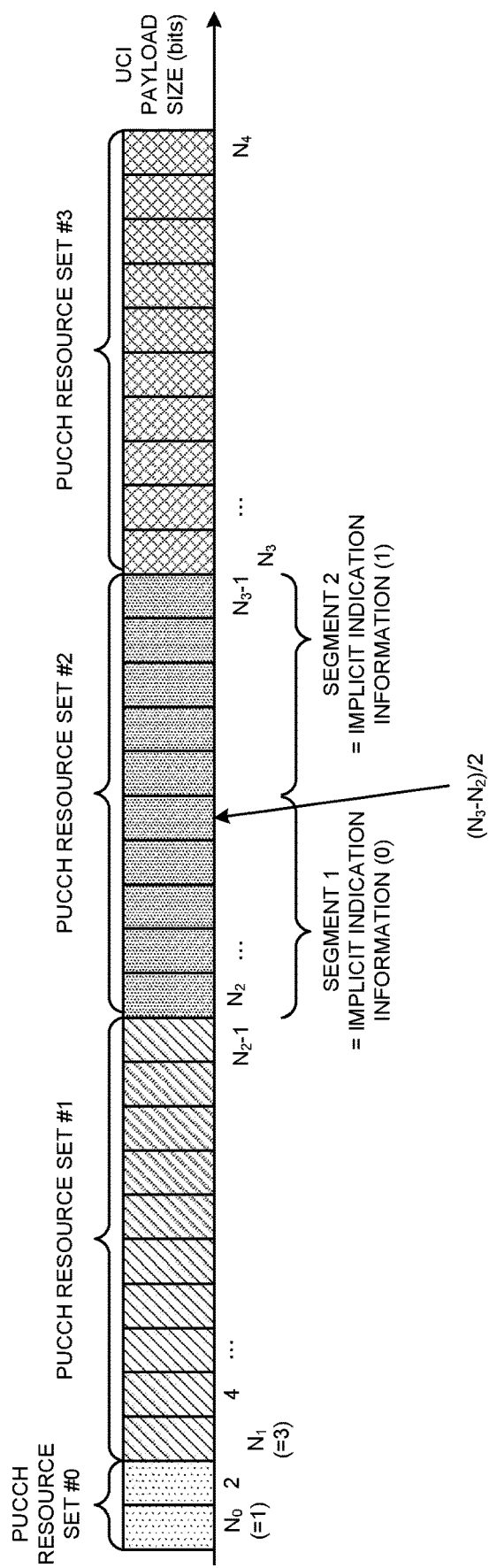
FIG. 4 is a diagram illustrating another example of the second deriving example of the implicit indication information according to the first aspect.

FIG. 4 is a diagram illustrating another example of the second deriving example of the implicit indication information according to the first aspect. In FIG. 4, a UCI payload size allocated to a PUCCH resource set may be segmented into X segments. In this regard, the number of segments (X) may be configured equally to the number of PUCCH resources (2 in FIG. 2B) associated with an identical value of a given field in DCI.

When, for example, a PUCCH resource set #k (k=2 in FIG. 4) is selected based on the UCI payload size, $(N_{k+1}-N_k)$ UCI payload sizes may be segmented into 2 segments according to $(N_{k+1}-N_k)/2$ as a reference. The user terminal may derive the implicit indication information based on which segment the UCI payload size (e.g., (5) the above number of bits of HARQ-ACK) belongs to.

More specifically, when the UCI payload size is $(N_{k+1}-N_k)/2$ or less, the user terminal may derive the implicit indication information "0" associated with the segment 1. On the other hand, when the UCI payload size is larger than $(N_{k+1}-N_k)/2$, the user terminal may derive the implicit indication information "1" associated with the segment 2.

Third Deriving Example

The third deriving example will describe a deriving example of the above implicit indication information that uses a higher layer signaling (e.g., RRC signaling). (7) the above configuration information of the Demodulation Reference Signal (DMRS) for the PDSCH and a type of a codebook of HARQ-ACK will be exemplified as information to be subjected to the higher layer signaling below, yet is not limited to this. The above implicit indication information may be derived based on other information to be subjected to the higher layer signaling.

FIG. 5 is a diagram illustrating one example of the third deriving example of the implicit indication information according to the first aspect. FIGS. 5A and 5B illustrate deriving examples of the implicit indication information based on configuration information of a DMRS (e.g., a DMRS type or position information of an additional DMRS). In addition, although not illustrated in FIGS. 5A and 5B, the implicit indication information may be derived based on a combination of the DMRS type and the position information of the additional DMRS.

FIG. 5A illustrates the deriving example based on a DMRS type for a PDSCH. As illustrated in FIG. 5A, when a type 1 is configured as the DMRS type of the PDSCH to the user terminal, implicit indication information "0" may be derived, and, when a type 2 is configured to the user terminal, implicit indication information "1" may be derived.

In this regard, the DMRS type is information that indicates a mapping pattern for a Resource Element (RE) of a DMRS. While the DMRS is mapped according to a beginning symbol of a slot as a reference according to the type 1, the DMRS is mapped according to a start symbol that is scheduled to a PDSCH as a reference. The DMRS type may be indicated by a higher layer parameter (e.g., "DL-DMRS-config-type").

FIG. 5B illustrates a deriving example based on position information of an additional DMRS for a PDSCH. As illustrated in FIG. 5B, when a first position (pos0) or a second position (post) is configured as the position information of the additional DMRS to the user terminal, implicit indication information "0" is derived, and, when a third position (pos2) or a fourth position (pos3) is configured to the user terminal, implicit indication information "1" may be derived.

In this regard, the position information of the additional DMRS is information that indicates a position of a DMRS to be additionally mapped. The position information of the additional DMRS may be indicated by a higher layer parameter (e.g., "DL-DMRS-add-pos").

FIG. 6 is a diagram illustrating another example of the third deriving example of the implicit indication information according to the first aspect. FIG. 6 illustrates the deriving example based on a type of a codebook (codebook type) of HARQ-ACK. As illustrated in FIG. 6, when a type 1 is configured as the codebook type of HARQ-ACK to the user terminal, implicit indication information "0" may be derived, and, when a type 2 is configured to the user terminal, implicit indication information "1" may be derived.

In this regard, the codebook type is information that indicates whether the number of bits of HARQ-ACK is controlled semi-statically or dynamically. While the number of bits of HARQ-ACK is semi-statically controlled according to the type 1, the number of bits of HARQ-ACK may be dynamically controlled based on a Downlink Assignment Indicator (DAI) according to the type 2. The codebook type may be notified by a higher layer signaling, or may be indicated by, for example, a higher layer parameter "HARQ-ACK-codebook".

Fourth Deriving Example

The fourth deriving example will describe another deriving example of the above implicit indication information. FIGS. 7A and 7B illustrate one example of the fourth deriving example of the implicit indication information according to the first aspect. In FIG. 7A, the user terminal derives the implicit indication information based on a cell to which a PDSCH is scheduled.

As illustrated in, for example, FIG. 7A, when the PDSCH is scheduled only to a Primary Cell (PCell), the user terminal may derive implicit indication information "0". On the other hand, when the PDSCH is scheduled to one or more SCells, too, in addition to the PCell, the user terminal may derive implicit indication information "1".

In FIG. 7A, there is a risk that, when failing detecting the PDCCH in the SCell, the user terminal erroneously derives implicit indication information. In this case, the radio base station may perform reception processing (e.g., at least one of demapping, demodulation and decoding) on UCI based on not only a PUCCH resource that is based on the erroneously derived implicit indication information "0" but also a PUCCH resource that is based on the erroneously derived implicit indication information "1".

In FIG. 7B, the user terminal derives the implicit indication information based on a UCI payload size. As illustrated in, for example, FIG. 7B, when the UCI payload size is an even number, the user terminal may derive implicit indication information "0", and, when the UCI payload size is an odd number, the user terminal may derive implicit indication information "1".

FIG. 8 is a diagram illustrating another example of the fourth deriving example of the implicit indication information according to the first aspect. In FIG. 8, the user terminal derives the implicit indication information based on a given field value of DCI transmitted in a given cell (e.g., SCell).

The given field may be, for example, a TPC command field. Although the TPC command field in the DCI transmitted in the PCell is used to control transmission power of a PUCCH, the TPC command field in the DCI to be transmitted in the SCell is assumed to be unused. Hence, as illustrated in FIG. 8, the given field value (e.g., TPC command field value) in the DCI to be transmitted in the SCell may indicate the implicit indication information.

According to the first aspect, even when a PUCCH resource set selected based on a UCI payload size includes the M (M>4) PUCCH resources, the user terminal can determine a PUCCH resource used for transmission of UCI from the M PUCCH resources based on the given field value in the DCI and the implicit indication information.

(Second Aspect)

The second aspect will describe determination of PUCCH resources used for transmission of one or more HARQ-ACKs (HARQ-ACKs for PDSCHs transmitted in one or more slots and/or one or more cells) in a time domain and/or a frequency domain. In addition, the second aspect will describe HARQ-ACK as one example of UCI. However, the UCI may include an SR and/or CSI in addition to the HARQ-ACK.

When a user terminal feeds back, to a radio base station, HARQ-ACKs for PDSCHs transmitted in one or more slots and/or one or more cells, the user terminal may determine PUCCH resources used for transmission of the HARQ-ACKs based on both of a given field value in DCI and above implicit indication information at all times (first determination example). Alternatively, in a similar case, whether or not to use the implicit indication information may be controlled (second determination example).

First Determination Example

According to the first determination example, in all of following cases A) to D), the user terminal determines the PUCCH resources used for transmission of the HARQ-ACKs based on both of the given field value in the DCI and the above implicit indication information.

A) A case where HARQ-ACK for a PDSCH transmitted in 1 slot and 1 cell is fed back
B) A case where HARQ-ACKs for PDSCHs transmitted in 1 slot and a plurality of cells are fed back
C) A case where HARQ-ACKs for PDSCHs transmitted in a plurality of slots and 1 cell are fed back
D) A case where HARQ-ACKs for PDSCHs transmitted in a plurality of slots and a plurality of cells are fed back In the case A), DCI used to determine a PUCCH resource for the HARQ-ACK may be DCI used to schedule the PDSCH. Furthermore, the above implicit indication information only needs to be derived as described in the first aspect.

In the case B), DCI used to determine a PUCCH resource for the HARQ-ACK may be DCI transmitted in a cell (CC) of a given index (e.g., a lowest index or a highest index). Furthermore, the above implicit indication information only needs to be derived as described in the first aspect (in a case based on the PDCCH, the above implicit indication information may be derived based on the PDCCH transmitted in a cell of a given index (e.g., the lowest index, the highest index, a second lowest index or a second highest index)).

In the case C), DCI used to determine a PUCCH resource for the HARQ-ACK may be DCI transmitted in a given slot (e.g., a beginning slot or a last (latest) slot). Furthermore, the above implicit indication information only needs to be derived as described in the first aspect (in a case based on the PDCCH, the above implicit indication information may be derived based on the PDCCH transmitted in a given slot (e.g., a beginning slot, a last (latest) slot, a second beginning slot or a second last slot).

In the case D), DCI used to determine a PUCCH resource for the HARQ-ACK may be DCI transmitted in a cell (CC) and a given slot (e.g., the beginning slot or the last (latest) slot) of given indices (e.g., the lowest indices or the highest indices). Furthermore, the above implicit indication information only needs to be derived as described in the first aspect (in a case based on the PDCCH, the above implicit indication information may be derived based on the PDCCH transmitted in a cell and a given slot of given indices (e.g., the lowest indices, the highest indices, the second lowest indices or the second highest indices), and, in a case based on the PDCCH, the above implicit indication information may be derived based on the PDCCH transmitted in a given slot (e.g., the beginning slot, the last (latest) slot, the second beginning slot or the second last slot).

Second Determination Example

According to the second determination example, in part of the above cases A) to D), the user terminal may determine a PUCCH resource used for transmission of the HARQ-ACK based on both of the given field value in the DCI and the above implicit indication information. That is, in part of the cases (e.g., above B) to D)), the user terminal may determine the PUCCH resource based on the given field value in the DCI without deriving the above implicit indication information.

More specifically, according to the second determination example, in the above cases B) to D), even when a PUCCH resource set selected based on a UCI payload size includes M (M>4) PUCCH resources, the PUCCH resources may be determined based on the given field value in the DCI without deriving the above implicit indication information. In this case, the user terminal may assume that the above implicit indication information is a fixed value (e.g., "0" or "1").

In addition, in the above cases B) to D), irrespectively of the number of detected PDCCHs (even when, for example, missing DCI for scheduling part of PDSCHs), the user terminal may determine the PUCCH resources based on the given field value in the DCI without deriving the above implicit indication information.

According to the second aspect, when one or more HARQ-ACKs are fed back in the time domain and/or the frequency domain, the user terminal can appropriately determine the PUCCH resources used for transmission of the HARQ-ACKs.

(Third Aspect)

According to the third aspect, when the number of PUCCH resources (M) included in a PUCCH resource set selected based on a UCI payload size is larger than 4, a user terminal determines a PUCCH resource used for transmission of UCI from M PUCCH resources based on given field values in one or more pieces of DCI.

More specifically, when a single PDCCH is transmitted by using DCI (e.g., above case A), the user terminal determines the PUCCH resource used for transmission of the UCI based on a value of the given field (also referred to as, for example, a PUCCH resource indicator or an ARI) in the DCI. In this case, the user terminal may assume that the above implicit indication information is a fixed value (e.g., "0" or "1").

On the other hand, when a plurality of pieces of DCI are respectively transmitted on a plurality of PDCCHs (e.g., above cases B to D), the user terminal determines the PUCCH resource used for transmission of the UCI, based on implicit indication information derived based on a given field value (that is, for example, a PUCCH resource indicator and for which FIG. 2A may to be referred to) in first DCI, and a given field value (that is, for example, a TPC command field and for which FIG. 8 may be referred to) in second DCI.

In this regard, the first DCI (also referred to as a first PDCCH) is DCI to be transmitted in a given cell and/or a given slot. For example, the first DCI may be DCI to be transmitted in a PCell or a cell (CC) of a lowest index, and/or DCI to be lastly transmitted.

The second DCI (also referred to as a second PDCCH) is DCI to be transmitted in a given cell and/or a given slot. For example, the second DCI may be DCI to be transmitted in a cell (CC) of the lowest index or a second lowest index, and/or DCI to be lastly or second lastly transmitted.

FIG. 9 is a diagram illustrating one example of the first and second DCI according to the third aspect. FIG. 9A illustrates one example of the first DCI (also referred simply to as DCI), and FIG. 9B illustrates one example of the second DCI. As illustrated in FIG. 9A, a first field value (e.g., PUCCH resource indicator) in the first DCI may be used as explicit indication information (e.g., a given field value in DCI in FIG. 2B) of a PUCCH resource. Furthermore, a second field value (e.g., TPC command field value) in the first DCI may be used to control transmission power of a PUCCH.

On the other hand, as illustrated in FIG. 9B, a first field value (e.g., TPC command field value) in the second DCI may be used to derive the above implicit indication information (see FIG. 8). Furthermore, a second field value (e.g., PUCCH resource indicator) in the second DCI may be unused, or a value identical to the first field value of the first DCI may be configured to the second field value in the second DCI.

Figure 10:
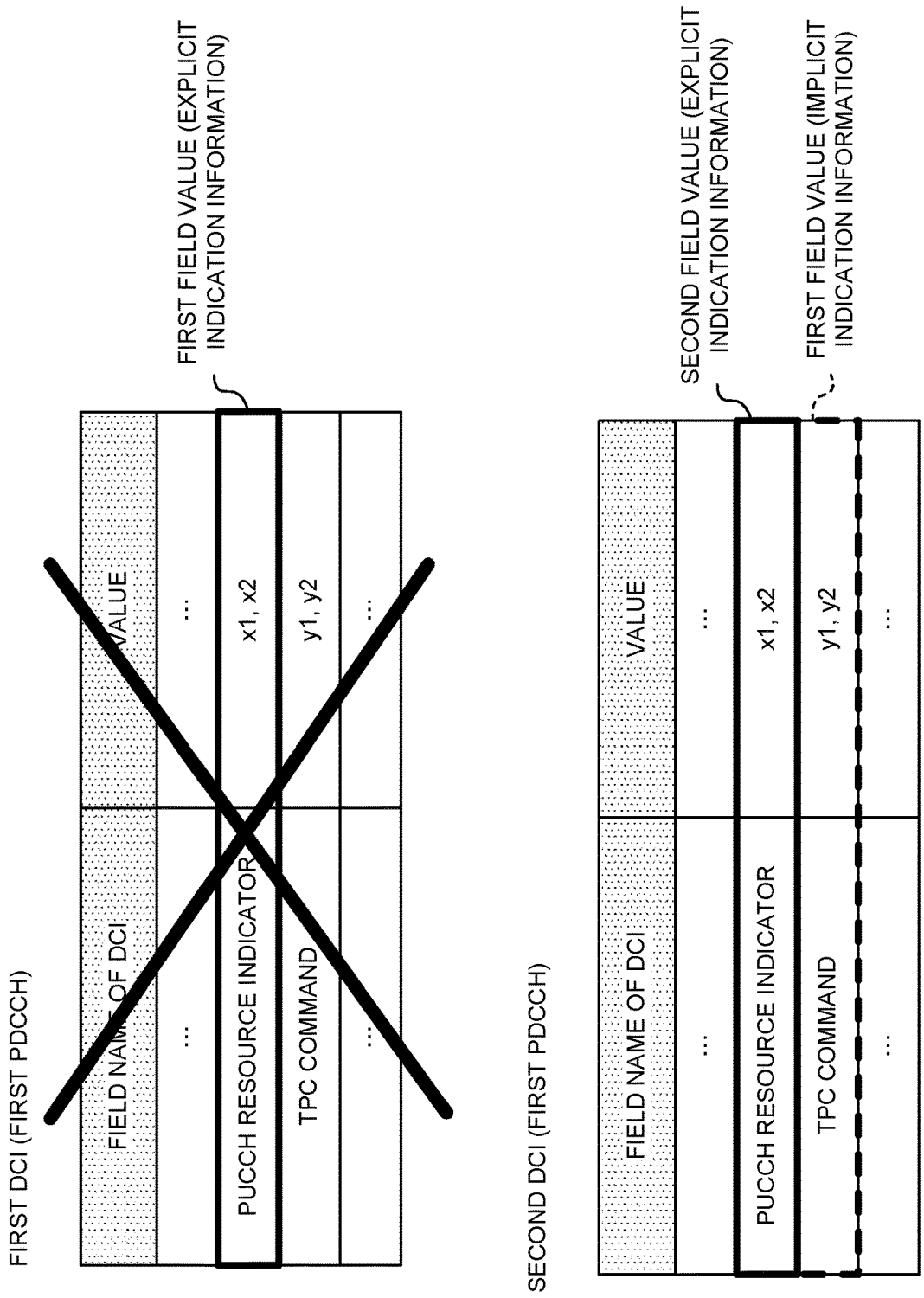
FIG. 10 is a diagram illustrating another example of the first and second DCI according to the third aspect.

FIG. 10 is a diagram illustrating another example of the first and second DCI according to the third aspect. FIG. 10 assumes that a value identical to the first field value of the first DCI used as the explicit indication information is configured to the second field value (e.g., PUCCH resource indicator) in the second DCI.

As illustrated in FIG. 10, when failing receiving (including, for example, detecting and decoding) the first DCI, the user terminal can determine a PUCCH resource based on implicit indication information derived based on the first field value (e.g., TPC command field value) in the second DCI, and the second field value (e.g., PUCCH resource indicator) that is the explicit indication information.

In FIG. 10, even when failing receiving (including, for example, detecting and decoding) the first DCI, the user terminal can determine a PUCCH resource identical to that in a case where the user terminal succeeds receiving the first DCI. Consequently, a radio base station does not need to blind-decode UCI assuming a plurality of PUCCH resources, and reduce a processing load of the radio base station related to decoding of the UCI.

Determination of a PUCCH resource in a case where HARQ-ACK for a PDSCH transmitted in one or more slots and/or one or more cells is fed back to the radio base station will be described in detail with reference to FIGS. 11 to 14. FIGS. 11 to 14 are diagrams illustrating first to fourth determination examples of PUCCH resources according to the third aspect. In addition, FIGS. 11 to 14 assume examples of cases where the number of PUCCH resources (M) included in a PUCCH resource set selected based on a UCI payload size is larger than 4.

Figure 11A:
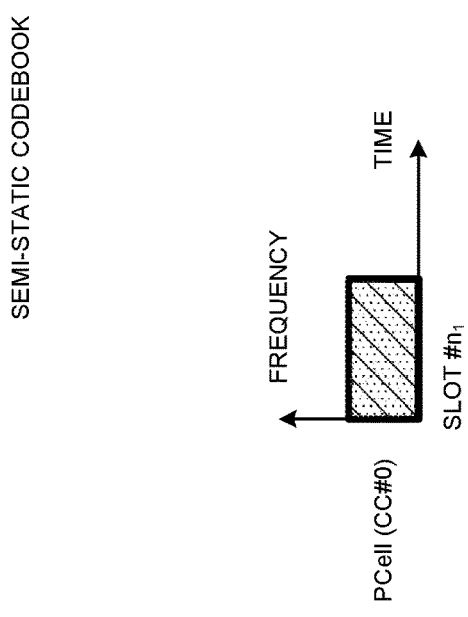
FIGS. 11A and 11B are diagrams illustrating a first determination example of a PUCCH resource according to the third aspect.

FIG. 11 illustrates the case (above case A) where HARQ-ACK for a PDSCH transmitted in 1 slot and 1 cell is fed back. FIG. 11A illustrates the case where a codebook (semi-static codebook) of HARQ-ACK of a type 1 is configured to the user terminal, and the number of cells (the number of CCs) and the number of slots in which a PDCCH and the PDSCH are transmitted are 1.

In the case in FIG. 11A, the user terminal may determine the PUCCH resource used for transmission of UCI from the M PUCCH resources based on the first field value (that is, for example, a PUCCH resource indicator and for which the first DCI in FIG. 9 may be referred to) in DCI (first DCI) for scheduling the PDSCH. The second field value (that is, for example, a TPC command field and for which the first DCI in FIG. 9 may be referred to) in the DCI is used to control transmission of the PUCCH. Therefore, implicit indication information is not derived based on the second field value. In this case, the user terminal may assume that the above implicit indication information is a fixed value (e.g., "0" or "1").

Figure 11B:
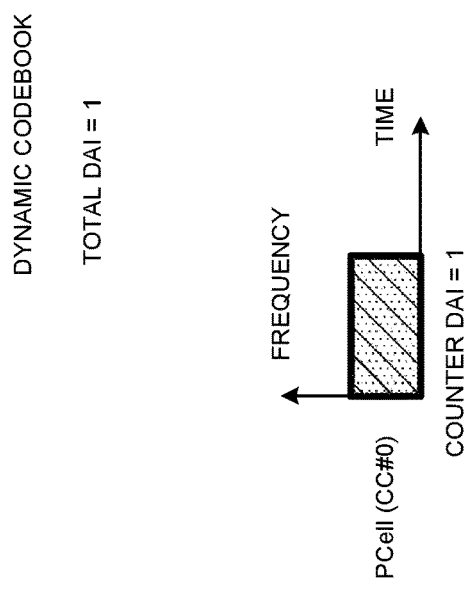

FIG. 11B illustrates the case where a codebook (dynamic codebook) of HARQ-ACK of a type 2 is configured to the user terminal, and a counter Downlink Assignment Indicator (Index) (DAI) and a total DAI included in DCI for scheduling the PDSCH are 1. In this regard, the counter DAI is information (count value) used to count the scheduled PDSCH. The total DAI is information that indicates a total number of scheduled PDSCHs.

In the case in FIG. 11B, the user terminal may determine a PUCCH resource used for transmission of UCI from the M PUCCH resources based on the first field value (that is, for example, a PUCCH resource indicator and for which the first DCI in FIG. 9 may be referred to) in DCI (first DCI) including the counter DAI and/or the total DAI. The second field value (that is, for example, a TPC command field and for which the first DCI in FIG. 9 may be referred to) in the DCI is used to control transmission power of the PUCCH. Therefore, implicit indication information is not derived based on the second field value. In this case, the user terminal may assume that the above implicit indication information is a fixed value (e.g., "0" or "1").

Figure 12A:
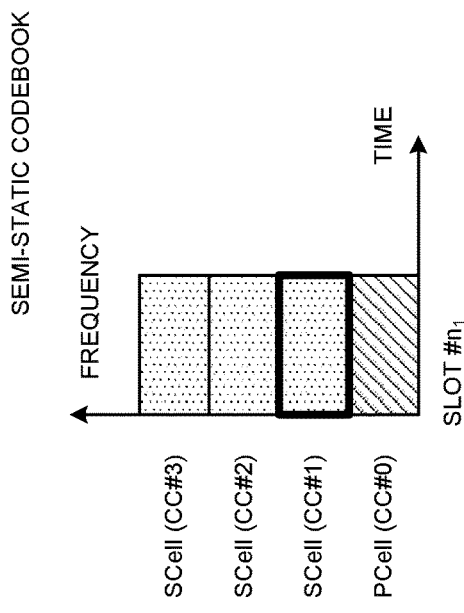
FIGS. 12A and 12B are diagrams illustrating a second determination example of a PUCCH resource according to the third aspect.

FIG. 12 illustrates the case (above case B) where HARQ-ACKs for PDSCHs transmitted in 1 slot and a plurality of cells are fed back. FIG. 12A illustrates the case where a codebook (semi-static codebook) of HARQ-ACK of the type 1 is configured to the user terminal, and the number of cells (the number of CCs) in which a PDCCH and/or the PDSCH (PDCCH/PDSCH) are transmitted is larger than 1, and the number of slots in which the PDCCH/PDSCH are transmitted is 1.

In the case in FIG. 12A, the user terminal controls transmission power of the PUCCH based on the second field value (that is, for example, a TPC command field value and for which the first DCI in FIG. 9 may be referred to) in DCI (first DCI) transmitted in a given cell (e.g., a cell (CC) #0 of the lowest index). In this case, the user terminal may derive implicit indication information based on the first field value (that is, for example, a TPC command field value and for which the second DCI in FIG. 9 may be referred to) in DCI (second DCI) transmitted in at least one of cells #1 to #3 other than the cell #0.

Furthermore, in the case in FIG. 12A, the user terminal may determine a PUCCH resource used for transmission of UCI from the M PUCCH resources based on the first field value (that is, for example, a PUCCH resource indicator and for which the first DCI in FIG. 9 may be referred to) in DCI (first DCI) transmitted in a given cell (e.g., the cell #1 of the second lowest index), and the above implicit indication information.

Figure 12B:
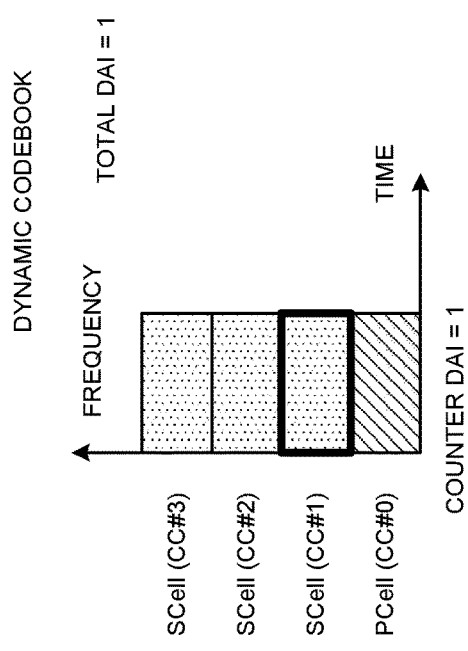

FIG. 12B illustrates the case where a codebook (dynamic codebook) of HARQ-ACK of the type 2 is configured to the user terminal, and the number of cells (the number of CCs) in which a PDCCH and/or the PDSCH (PDCCH/PDSCH) are transmitted is larger than 1, and the number of slots in which the PDCCH/PDSCH are transmitted is 1. A counter DAI and a total DAI in the DCI transmitted in FIG. 12B are 1. In FIG. 12B, the user terminal may determine the PUCCH resource as described with reference to FIG. 12A.

Figure 13A:
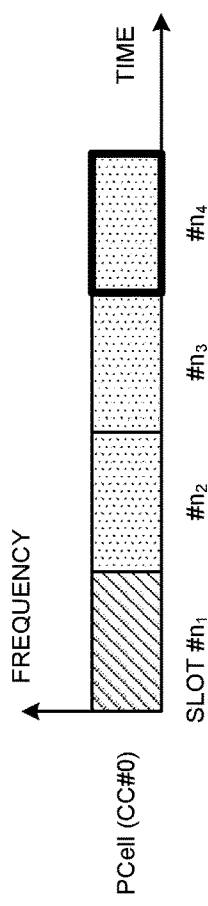
FIGS. 13A and 13B are diagrams illustrating a third determination example of a PUCCH resource according to the third aspect.

FIG. 13 illustrates a case (above case C) where HARQ-ACKs for PDSCHs transmitted in a plurality of slots and 1 cell are fed back. FIG. 13A illustrates the case where a codebook (semi-static codebook) of HARQ-ACK of the type 1 is configured to the user terminal, and the number of slots in which a PDCCH/PDSCH are transmitted is larger than 1.

In the case in FIG. 13A, the user terminal controls transmission power of the PUCCH based on the second field value (that is, for example, a TPC command field value and for which the first DCI in FIG. 9 may be referred to) in DCI (first DCI) transmitted in a given slot (e.g., a slot #$n_1$ of the lowest index). In this case, the user terminal may derive implicit indication information based on the first field value (that is, for example, a TPC command field value and for which the second DCI in FIG. 9 may be referred to) in DCI (second DCI) transmitted in at least one of slots #$n_2$ to #$n_4$ other than the slot #$n_1$.

Furthermore, in the case in FIG. 13A, the user terminal may determine a PUCCH resource used for transmission of UCI from the M PUCCH resources based on the first field value (that is, for example, a PUCCH resource indicator and for which the first DCI in FIG. 9 may be referred to) in DCI (first DCI) transmitted in a given slot (e.g., a latest slot), and the above implicit indication information.

Figure 13B:
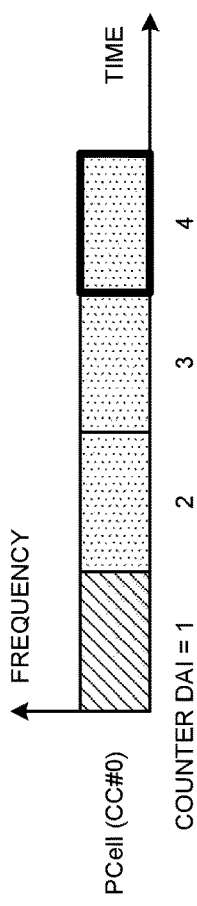

FIG. 13B illustrates the case where a codebook (dynamic codebook) of HARQ-ACK of the type 2 is configured to the user terminal, and a total DAI in DCI is larger than 1. For example, the total DAI in the DCI transmitted in FIG. 13B is 4.

In the case in FIG. 13B, the user terminal controls transmission power of the PUCCH based on the second field value (that is, for example, a TPC command field value and for which the first DCI in FIG. 9 may be referred to) in DCI (first DCI) transmitted by a given counter DAI value (e.g., a lowest counter DAI value=1). In this case, the user terminal may derive implicit indication information based on the first field value (that is, for example, a TPC command field value and for which the second DCI in FIG. 9 may be referred to) in at least one of 3 pieces of DCI (second DCI) respectively including counter DAI values "2" to "4".

Furthermore, in the case in FIG. 13B, the user terminal may determine a PUCCH resource used for transmission of UCI from the M PUCCH resources based on the first field value (that is, for example, a PUCCH resource indicator and for which the first DCI in FIG. 9 may be referred to) in DCI (first DCI) transmitted in a given slot (e.g., the latest slot), and the above implicit indication information.

FIG. 14 illustrates the case (above case D) where HARQ-ACKs for PDSCHs transmitted in a plurality of slots and a plurality of cells are fed back. FIG. 14A illustrates the case where a codebook (semi-static codebook) of HARQ-ACK of the type 1 is configured to the user terminal, and the number of slots in which a PDCCH/PDSCH are transmitted is larger than 1, and the number of cells is also larger than 1.

In the case in FIG. 14A, the user terminal controls transmission power of the PUCCH based on the second field value (that is, for example, a TPC command field value and for which the first DCI in FIG. 9 may be referred to) in DCI (first DCI) transmitted in a given cell (e.g., the cell (CC) #0 of the lowest index) and a given slot (e.g., the slot #$n_1$ of the lowest index). In this case, the user terminal may derive implicit indication information based on the first field value (that is, for example, a TPC command field value and for which the second DCI in FIG. 9 may be referred to) in DCI (second DCI) transmitted in at least one of cells (CCs) #1 to #3 and the slots #$n_2$ to #$n_4$.

Furthermore, in the case in FIG. 14A, the user terminal may determine a PUCCH resource used for transmission of UCI from the M PUCCH resources based on the first field value (that is, for example, a PUCCH resource indicator and for which the first DCI in FIG. 9 may be referred to) in DCI (first DCI) transmitted in a given cell (e.g., the cell #0 of the lowest index) and a given slot (e.g., latest slot), and the above implicit indication information.

FIG. 14B illustrates the case where a codebook (dynamic codebook) of HARQ-ACK of the type 2 is configured to the user terminal, and a total DAI in DCI is larger than 1, and the number of slots in which a PDCCH/PDSCH are transmitted is larger than 1. For example, the total DAI in the DCI transmitted in FIG. 14B is 4.

In the case in FIG. 14B, the user terminal controls transmission power of the PUCCH based on the second field value (that is, for example, a TPC command field value and for which the first DCI in FIG. 9 may be referred to) in DCI (first DCI) transmitted in a given cell (e.g., the cell #0 of the lowest index) and a given counter DAI value (e.g., lowest counter DAI value=1). In this case, the user terminal may derive implicit indication information based on the first field value (that is, for example, a TPC command field value and for which the second DCI in FIG. 9 may be referred to) in at least one of the cells (CCs) #1 to #3 and the counter DAI values "2" to "4".

Furthermore, in the case in FIG. 14B, the user terminal may determine a PUCCH resource used for transmission of UCI from the M PUCCH resources based on the first field value (that is, for example, a PUCCH resource indicator and for which the first DCI in FIG. 9 may be referred to) in DCI (first DCI) transmitted in a given cell (e.g., the cell (CC) #0 of the lowest index) and a given slot (e.g., latest slot), and the above implicit indication information.

According to the third aspect, the user terminal can appropriately determine a PUCCH resource used for transmission of UCI from the M PUCCH resources based on given field values in one or more pieces of DCI.

(Radio Communication System)

The configuration of the radio communication system according to the present embodiment will be described below. This radio communication system is applied the radio communication method according to each of the above aspects. In addition, the radio communication method according to each of the above aspects may be applied alone or may be applied by combining at least two of the radio communication methods.

Figure 15:
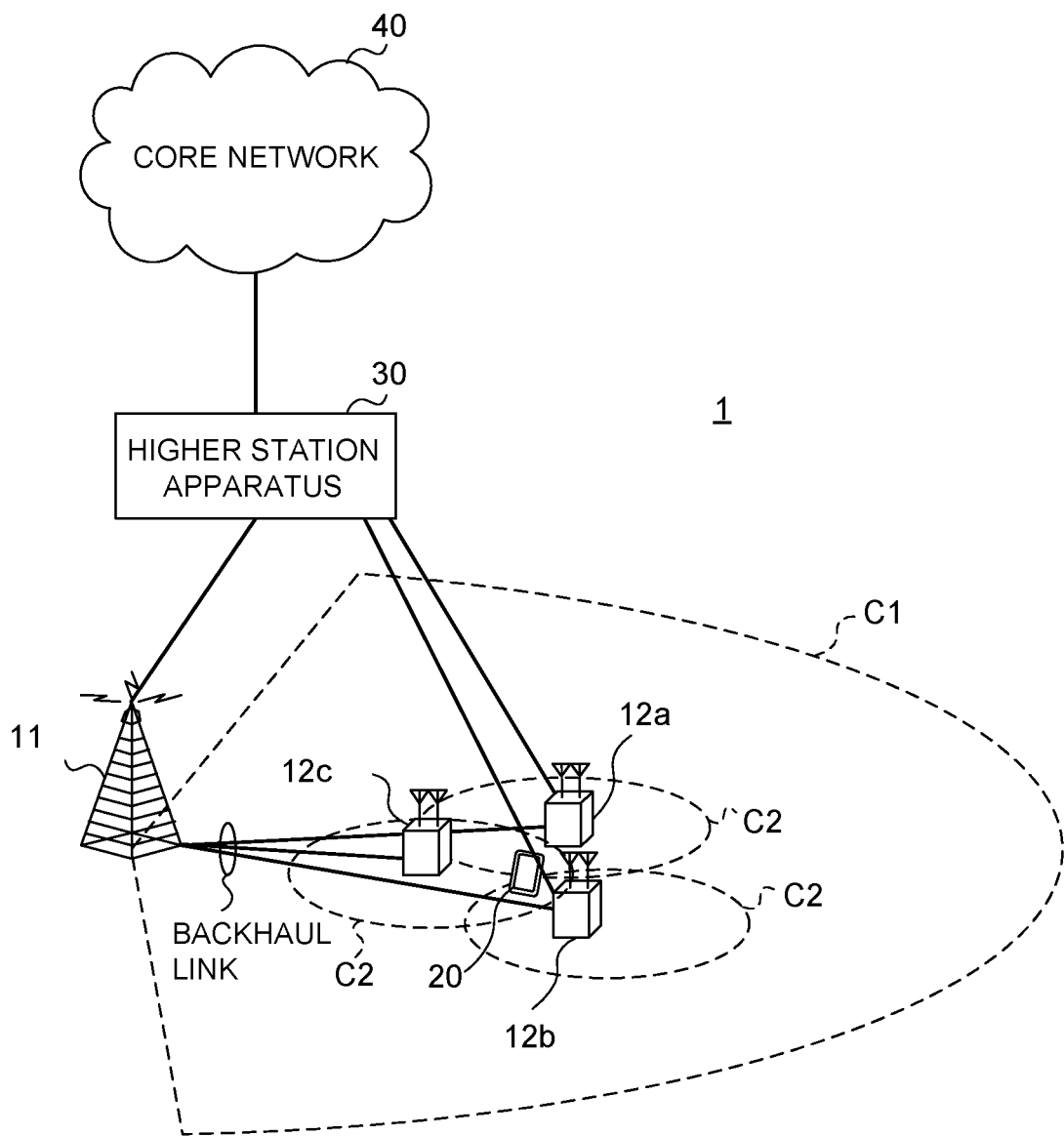
FIG. 15 is a diagram illustrating one example of a schematic configuration of a radio communication system according to the present embodiment.

FIG. 15 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system. In this regard, the radio communication system 1 may be referred to as SUPER 3G, LTE-Advanced (LTE-A), IMT-Advanced, 4G, 5G, Future Radio Access (FRA) or New Radio Access Technology (NR: New-RAT).

The radio communication system 1 illustrated in FIG. 15 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. Different numerologies may be configured to be applied between cells and/or in the cells.

In addition, the numerology is a communication parameter (e.g., at least one of a spacing of a subcarrier (subcarrier spacing), a bandwidth, a symbol length, a CP time duration (CP length), a subframe length, a TTI time duration (TTI length), the number of symbols per TTI, a radio frame configuration, filtering processing and windowing processing) in a frequency direction and/or a time direction. The radio communication system 1 may support subcarrier spacings such as 15 kHz, 30 kHz, 60 kHz, 120 kHz and 240 kHz.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two CCs or more). Furthermore, the user terminal can use licensed band CCs and unlicensed band CCs as a plurality of cells.

Furthermore, the user terminal 20 can perform communication by using Time Division Duplex (TDD) or Frequency Division Duplex (FDD) in each cell. A TDD cell and an FDD cell may be referred to as a TDD carrier (frame configuration type 2) and an FDD carrier (frame configuration type 1), respectively.

Furthermore, each cell (carrier) may be applied a single numerology or may be applied a plurality of different numerologies.

The user terminal 20 and the radio base station 11 can communicate by using a carrier (referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB), a gNode (gNB) or a transmission/reception point (TRP). Furthermore, each radio base station 12 is a radio base station that has a local coverage, and may be referred to as a small base station, a micro base station, a pico base station, a femto base station, a Home eNodeB (HeNB), a Remote Radio Head (RRH), an eNB, a gNB or a transmission/reception point. The radio base stations 11 and 12 will be collectively referred to as a radio base station 10 below when not distinguished.

Each user terminal 20 is a terminal that supports various communication schemes such as LTE, LTE-A, 5G and NR, and may include not only a mobile communication terminal but also a fixed communication terminal. Furthermore, the user terminal 20 can perform Device-to-Device communication (D2D) with the other user terminal 20.

The radio communication system 1 can apply Orthogonal Frequency-Division Multiple Access (OFDMA) to Downlink (DL) and can apply Single Carrier-Frequency Division Multiple Access (SC-FDMA) to Uplink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and OFDMA may be used on UL.

Furthermore, the radio communication system 1 may use a multicarrier waveform (e.g., OFDM waveform), or may use a single carrier waveform (e.g., DFT-s-OFDM waveform).

The radio communication system 1 uses a DL shared channel (also referred to as, for example, a PDSCH: Physical Downlink Shared Channel or a DL data channel) shared by each user terminal 20, a broadcast channel (PBCH: Physical Broadcast Channel) and an L1/L2 control channel as DL channels. User data, higher layer control information and a System Information Block (SIB) are conveyed on the PDSCH. Furthermore, a Master Information Block (MIB) is conveyed on the PBCH.

The L1/L2 control channel includes a DL control channel (a Physical Downlink Control Channel (PDCCH) or an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. The EPDCCH is subjected to frequency division multiplexing with the PDSCH and is used to convey DCI similar to the PDCCH. Retransmission control information (ACK/NACK) of an HARQ for the PUSCH can be conveyed on at least one of the PHICH, the PDCCH and the EPDCCH.

The radio communication system 1 uses a UL shared channel (also referred to as, for example, a PUSCH: Physical Uplink Shared Channel or an uplink shared channel) shared by each user terminal 20, an uplink control channel (PUCCH: Physical Uplink Control Channel), and a random access channel (PRACH: Physical Random Access Channel) as UL channels. User data and higher layer control information are conveyed on the PUSCH. Uplink Control Information (UCI) including at least one of retransmission control information (A/N) or Channel State Information (CSI) of a DL signal is conveyed on the PUSCH or the PUCCH. A random access preamble for establishing connection with a cell can be conveyed on the PRACH.

<Radio Base Station>

Figure 16:
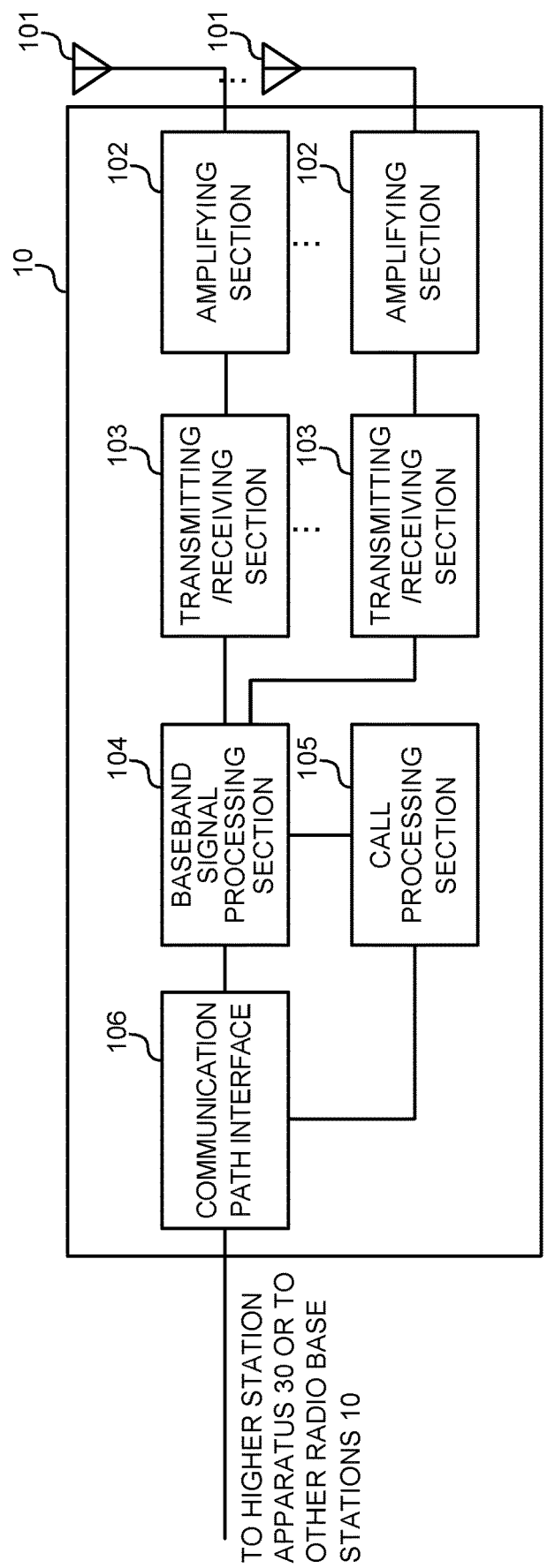
FIG. 16 is a diagram illustrating one example of an overall configuration of a radio base station according to the present embodiment.

FIG. 16 is a diagram illustrating one example of an overall configuration of the radio base station according to the present embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on DL is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., Hybrid Automatic Repeat reQuest (HARQ) transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency range, and transmits a radio frequency signal. The radio frequency signal subjected to frequency conversion by each transmission/reception section 103 is amplified by each amplifying section 102, and is transmitted from each transmission/reception antenna 101.

The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as a UL signal. Each transmission/reception section 103 receives the UL signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on UL data included in the input UL signal, and transfers the UL data to the higher station apparatus 30 via the channel interface 106. The call processing section 105 performs call processing such as configuration and release of a communication channel, state management of the radio base station 10 and radio resource management.

The channel interface 106 transmits and receives signals to and from the higher station apparatus 30 via a given interface. Furthermore, the channel interface 106 may transmit and receive (backhaul signaling) signals to and from the neighboring radio base station 10 via an inter-base station interface (e.g., optical fibers compliant with the Common Public Radio Interface (CPRI) or the X2 interface).

Furthermore, each transmission/reception section 103 transmits a DL signal (including at least one of a DL data signal, a DL control signal and a DL reference signal) to the user terminal 20, and receives a UL signal (including at least one of a UL data signal, a UL control signal and a UL reference signal) from the user terminal 20.

Furthermore, each transmission/reception section 103 receives UCI from the user terminal 20 by using an uplink shared channel (e.g., PUSCH) or an uplink control channel (e.g., a short PUCCH and/or a long PUCCH). The UCI may include at least one of HARQ-ACK for a DL data channel (e.g. PDSCH), CSI, an SR and beam identification information (e.g., a Beam Index (BI) or a Buffer Status Report (BSR)).

Furthermore, each transmission/reception section 103 may transmit control information related to the uplink control channel (e.g., the short PUCCH or the long PUCCH) (e.g., at least one of a format, the number of PUCCH units in a slot, a PUCCH unit size, an RS multiplexing method, an RS arrangement position, whether or not there is an RS, an RS density, whether or not there is an SRS and resources for the uplink control channel) by a physical layer signaling (L1 signaling) and/or a higher layer signaling.

Figure 17:
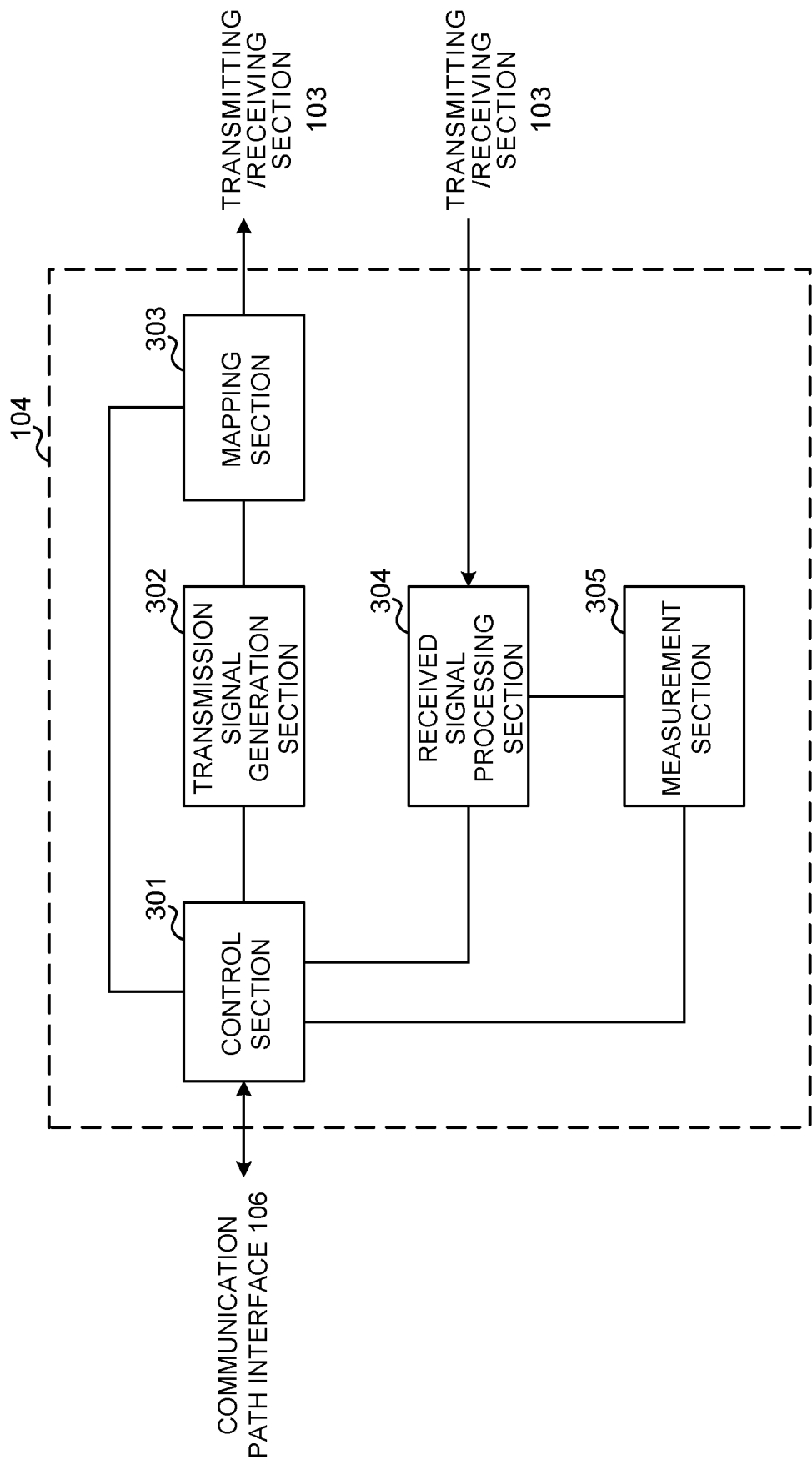
FIG. 17 is a diagram illustrating one example of a function configuration of the radio base station according to the present embodiment.

FIG. 17 is a diagram illustrating one example of a function configuration of the radio base station according to the present embodiment. In addition, FIG. 17 mainly illustrates function blocks of characteristic portions according to the present embodiment, and assumes that the radio base station 10 includes other function blocks, too, that are necessary for radio communication. As illustrated in FIG.

17, the baseband signal processing section 104 includes a control section 301, a transmission signal generating section 302, a mapping section 303, a received signal processing section 304 and a measurement section 305.

The control section 301 controls the entire radio base station 10. The control section 301 controls, for example, DL signal generation of the transmission signal generating section 302, DL signal mapping of the mapping section 303, UL signal reception processing (e.g., demodulation) of the received signal processing section 304, and measurement of the measurement section 305.

More specifically, the control section 301 schedules the user terminal 20. More specifically, the control section 301 may perform scheduling and/or retransmission control on DL data and/or the uplink shared channel based on the UCI (e.g., the CSI and/or the BI) from the user terminal 20.

Furthermore, the control section 301 may control an uplink control channel (e.g., the long PUCCH and/or the short PUCCH) configuration (format), and perform control to transmit the control information related to the uplink control channel.

Furthermore, the control section 301 may control a PUCCH resource configuration. More specifically, the control section 301 may perform control to configure K PUCCH resource sets each including M PUCCH resources to the user terminal based on a UCI payload size.

Furthermore, the control section 301 may control reception processing of the UCI that uses PUCCH resources determined based on a given field value in DCI and/or implicit indication information by the user terminal. The control section 301 may control blind-detection of the PUCCH resources.

The control section 301 may control the received signal processing section 304 to perform the reception processing on the UCI from the user terminal 20 based on an uplink control channel format.

The control section 301 can be composed of a controller, a control circuit or a control apparatus described based on the common knowledge in the technical field according to the present invention.

The transmission signal generating section 302 generates a DL signal (including a DL data signal, a DL control signal or a DL reference signal) based on an instruction from the control section 301, and outputs the DL signal to the mapping section 303.

The transmission signal generating section 302 can be composed of a signal generator, a signal generating circuit or a signal generating apparatus described based on the common knowledge in the technical field according to the present invention.

The mapping section 303 maps the DL signal generated by the transmission signal generating section 302, on given radio resources based on the instruction from the control section 301, and outputs the DL signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a UL signal (including, for example, a UL data signal, a UL control signal or UL reference signal) transmitted from the user terminal 20. More specifically, the received signal processing section 304 outputs the received signal or the signal after the reception processing to the measurement section 305. Furthermore, the received signal processing section 304 performs the reception processing on the UCI based on the uplink control channel configuration instructed by the control section 301.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure UL channel quality based on, for example, received power (e.g., Reference Signal Received Power (RSRP)) and/or received quality (e.g., Reference Signal Received Quality (RSRQ)) of a UL reference signal. The measurement section 305 may output a measurement result to the control section 301.

<User Terminal>

Figure 18:
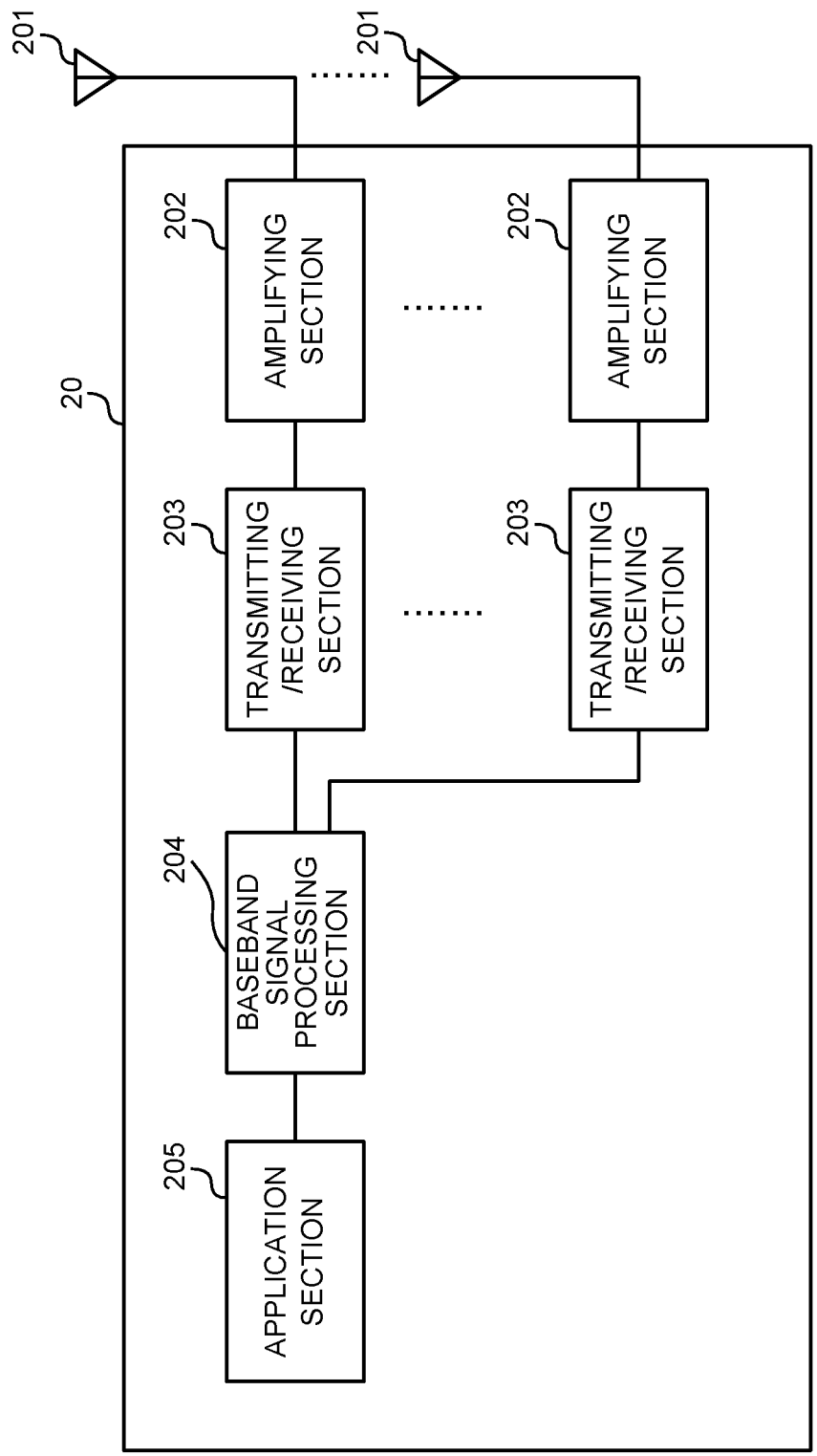
FIG. 18 is a diagram illustrating one example of an overall configuration of a user terminal according to the present embodiment.

FIG. 18 is a diagram illustrating one example of an overall configuration of the user terminal according to the present embodiment. The user terminal 20 includes pluralities of transmission/reception antennas 201 for MIMO transmission, amplifying sections 202 and transmission/reception sections 203, a baseband signal processing section 204 and an application section 205.

The respective amplifying sections 202 amplify radio frequency signals received at a plurality of transmission/reception antennas 201. Each transmission/reception section 203 receives a DL signal amplified by each amplifying section 202. Each transmission/reception section 203 performs frequency conversion on the received signal into a baseband signal, and outputs the baseband signal to the baseband signal processing section 204.

The baseband signal processing section 204 performs FFT processing, error correcting decoding and retransmission control reception processing on the input baseband signal. The baseband signal processing section 204 transfers DL data to the application section 205. The application section 205 performs processing related to layers higher than a physical layer and an MAC layer. Furthermore, the baseband signal processing section 204 may transfer broadcast information, too, to the application section 205.

On the other hand, the application section 205 inputs UL data to the baseband signal processing section 204. The baseband signal processing section 204 performs retransmission control transmission processing (e.g., HARQ transmission processing), channel coding, rate matching, puncturing, Discrete Fourier Transform (DFT) processing and IFFT processing on the UL data, and transfers the UL data to each transmission/reception section 203. The baseband signal processing section 204 performs at least one of channel coding, rate matching, puncturing, DFT processing and IFFT processing on the UCI, too, and transfers the UCI to each transmission/reception section 203.

Each transmission/reception section 203 converts the baseband signal output from the baseband signal processing section 204 into a radio frequency range, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 receives the DL signal (including the DL data signal, the DL control signal (DCI) and the DL reference signal) of numerologies configured to the user terminal 20, and transmits the UL signal (including the UL data signal, the UL control signal and the UL reference signal) of the numerologies.

Furthermore, each transmission/reception section 203 transmits the UCI to the radio base station 10 by using the uplink shared channel (e.g., PUSCH) or the uplink control channel (e.g., the short PUCCH and/or the long PUCCH).

Furthermore, each transmission/reception section 203 may receive information indicating the K PUCCH resource sets each including the M PUCCH resources. Furthermore, each transmission/reception section 203 may receive higher layer control information (higher layer parameter).

The transmission/reception sections 203 can be composed as transmitters/receivers, transmission/reception circuits or transmission/reception apparatuses described based on the common knowledge in the technical field according to the present invention. Furthermore, the transmission/reception sections 203 may be composed as an integrated transmission/reception section or may be composed of transmission sections and reception sections.

Figure 19:
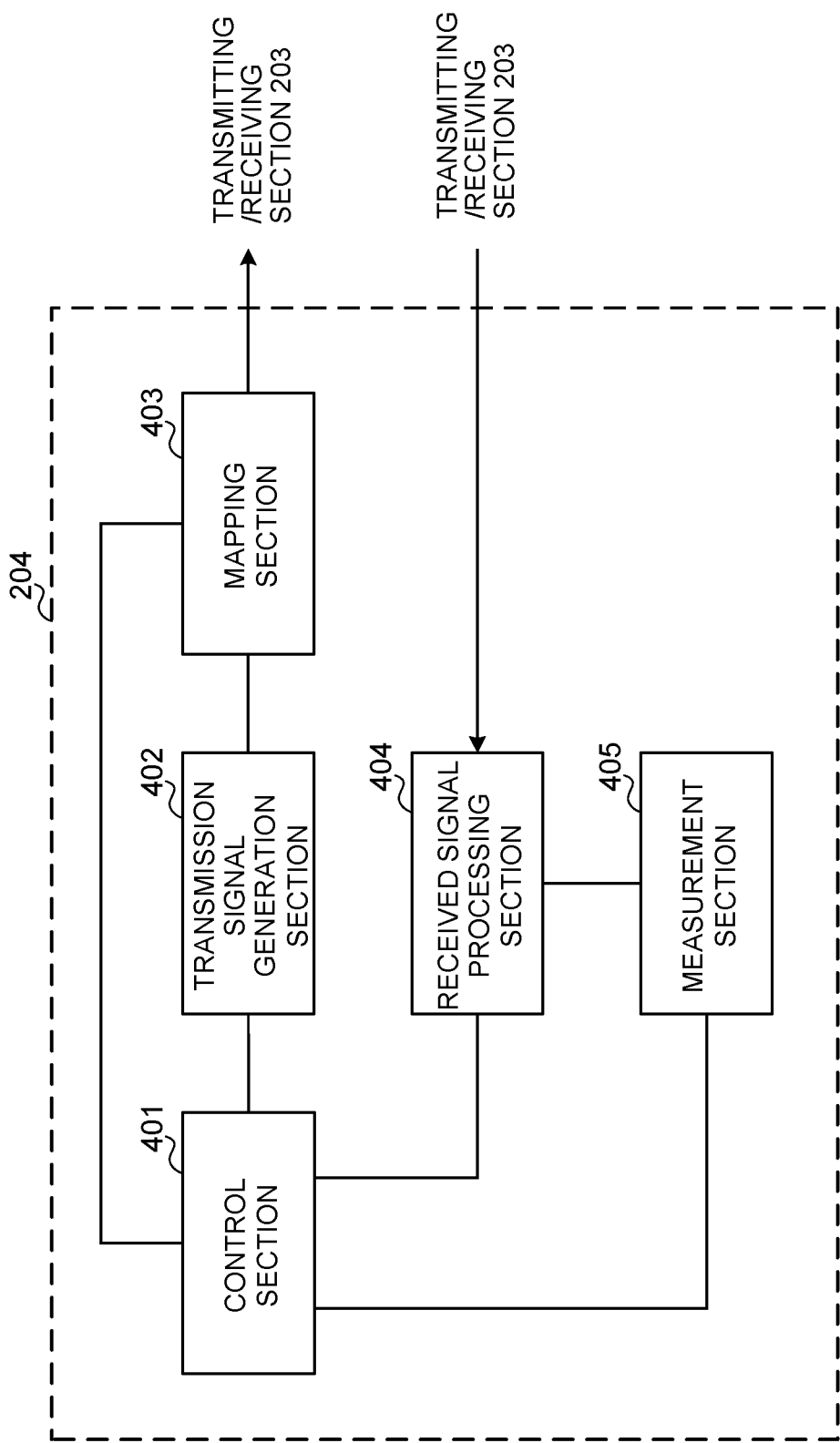
FIG. 19 is a diagram illustrating one example of a function configuration of the user terminal according to the present embodiment.

FIG. 19 is a diagram illustrating one example of a function configuration of the user terminal according to the present embodiment. In addition, FIG. 19 mainly illustrates function blocks of characteristic portions according to the present embodiment, and assumes that the user terminal 20 includes other function blocks, too, that are necessary for radio communication. As illustrated in FIG. 19, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls, for example, UL signal generation of the transmission signal generating section 402, UL signal mapping of the mapping section 403, DL signal reception processing of the received signal processing section 404, and measurement of the measurement section 405.

Furthermore, the control section 401 controls the uplink control channel used for transmission of the UCI from the user terminal 20, based on an explicit indication from the radio base station 10 and implicit determination in the user terminal 20. Furthermore, the control section 401 controls transmission of the UCI.

Furthermore, the control section 401 may control the uplink control channel (e.g., the long PUCCH and/or the short PUCCH) configuration (format). The control section 401 may control the uplink control channel format based on the control information from the radio base station 10. Furthermore, the control section 401 may control a PUCCH format (uplink control channel format) used for transmission of the UCI, based on information related to fallback.

Furthermore, when one or more resource sets (PUCCH resource sets) each including one or more resources (PUCCH resources) for the uplink control channel are configured, the control section 401 may determine a resource used for transmission of the UCI based on a given field value in Downlink Control Information (DCI) and implicit indication information from a resource set selected based on the number of bits of the UCI.

Furthermore, when the selected resource set includes more than 4 resources, the control section 401 may determine the resource from the selected resource set based on a 2-bit given field value in the DCI and the implicit indication information.

Furthermore, the control section 401 may control whether or not to derive the above implicit indication information to determine the resource used for transmission of the UCI (second and third aspects). Alternatively, the control section 401 may derive the above implicit indication information at all times (the second aspect and the first determination example).

More specifically, when the UCI including transmission acknowledgement information for a downlink shared channel associated with 1 slot and 1 cell is transmitted (e.g., the above case A), the control section 401 may determine the resource from the selected resource set based on the given field value in the DCI for scheduling the downlink shared channel, and the implicit indication information (the second aspect and the second determination example). On the other hand, in cases (e.g., one of the above cases B) to D)) other than the above, the control section 401 may determine the above resource based on the given field value in the DCI without deriving the implicit indication information.

Furthermore, when the UCI including transmission acknowledgement information for a plurality of downlink shared channels associated with a plurality of slots and/or a plurality of cells is transmitted (e.g., one of the above cases B) to D)), the control section 401 may determine the resource from the selected resource set based on the given field value in the DCI transmitted in a given slot and a given cell, and the implicit indication information (third aspect). On the other hand, in a case (e.g., the above case A)) other than the above, the control section 401 may determine the above resource based on the given field value in the DCI without deriving the implicit indication information.

Furthermore, the control section 401 may derive the implicit indication information based on at least one of a lowest index of a control resource element on which a downlink control channel used for transmission of the downlink control information is mapped, an index of a control resource set associated with the downlink control channel, an index of a search space associated with the downlink control channel, a state of a transmission configuration indicator associated with the downlink control channel, the number of bits of the transmission acknowledgement information for the downlink shared channel, the given field value in the downlink control information used for scheduling in a secondary cell, configuration information of a demodulation reference signal, the number of bits of the UCI, and a type of a codebook for the transmission acknowledgement information (first aspect).

The control section 401 can be composed of a controller, a control circuit or a control apparatus described based on the common knowledge in the technical field according to the present invention.

The transmission signal generating section 402 generates (e.g., encodes, rate-matches, punctures or modulates) a UL signal (including a UL data signal, a UL control signal, a UL reference signal or UCI) based on an instruction from the control section 401, and outputs the UL signal to the mapping section 403. The transmission signal generating section 402 can be composed of a signal generator, a signal generating circuit or a signal generating apparatus described based on the common knowledge in the technical field according to the present invention.

The mapping section 403 maps the UL signal generated by the transmission signal generating section 402, on radio resources based on the instruction from the control section 401, and outputs the UL signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signal (the DL data signal, the scheduling information, the DL control signal or the DL reference signal). The received signal processing section 404 outputs information received from the radio base station 10 to the control section 401. The received signal processing section 404 outputs, for example, broadcast information, system information, higher layer control information of a higher layer signaling such as an RRC signaling and physical layer control information (L1/L2 control information) to the control section 401.

The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The measurement section 405 measures a channel state based on a reference signal (e.g., CSI-RS) from the radio base station 10, and outputs a measurement result to the control section 401. In addition, the measurement section 405 may measure the channel state per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

<Hardware Configuration>

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 20:
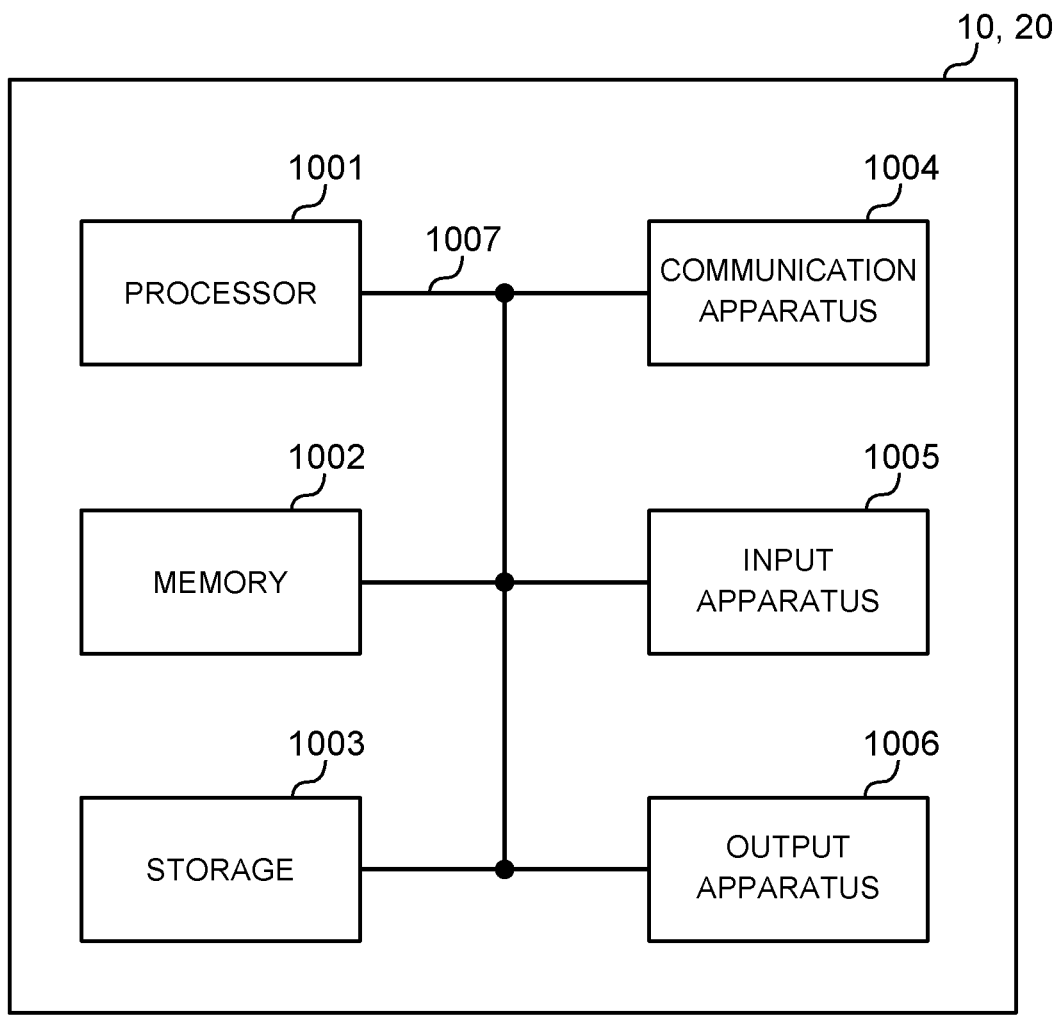
FIG. 20 is a diagram illustrating one example of hardware configurations of the radio base station and the user terminal according to the present embodiment.

For example, the radio base station and the user terminal according to the one embodiment of the present invention may function as computers that perform processing of the radio communication method according to the present invention. FIG. 20 is a diagram illustrating one example of the hardware configurations of the radio base station and the user terminal according to the one embodiment of the present invention. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 20 or may be configured without including part of the apparatuses.

For example, FIG. 20 illustrates the only one processor 1001. However, there may be a plurality of processors. Furthermore, processing may be executed by 1 processor or processing may be executed by 1 or more processors concurrently or successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time domain. Each of one or a plurality of durations (frames) that composes a radio frame may be referred to as a subframe. Furthermore, the subframe may include one or a plurality of slots in the time domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a sub slot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. Furthermore, the RB may include one or a plurality of symbols in the time domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspects/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying the given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description can be interchangeably used.

In this description, the terms "Base Station (BS)", "radio base station", "eNB", "gNB", "cell", "sector", "cell group", "carrier" and "component carrier" can be interchangeably used. The base station will be also referred to as a term such as a fixed station, a NodeB, an eNodeB (eNB), an access point, a transmission point, a reception point, a transmission/reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be interchangeably used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

The base station and/or the mobile station may be referred to as a transmission apparatus or a reception apparatus.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMES) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of the physical and logical connections. For example, "connection" may be read as "access".

It can be understood in this description that, when connected, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description is intended for exemplary explanation, and does not bring any restrictive meaning to the present invention.

The invention claimed is:

1. A terminal comprising:
   a receiver that receives one or more pieces of downlink control information for scheduling of one or more physical downlink shared channels (PDSCHs); and
   a processor that, when a hybrid automatic repeat request-acknowledgement (HARQ-ACK) information for the PDSCHs is transmitted in a slot, determines based on a number of cells used for transmission of the PDSCHs whether or not to use a control channel element (CCE) index for determination of a physical uplink control channel (PUCCH) resource carrying the HARQ-ACK information,
   wherein the processor determines not to use the CCE index for the determination of the PUCCH resource when the number of cells used for transmission of the PDSCHs is more than a value, and
   wherein the processor determines not to use the CCE index for the determination of the PUCCH resource irrespective of a number of the one or more pieces of the downlink control information received by the receiver.

2. The terminal according to claim 1, wherein the CCE index is an index of CCE in the last physical downlink control channel (PDCCH) of one or more PDCCHs carrying the pieces of downlink control information.

3. The terminal according to claim 2, wherein the CCE index is an index of CCE in a PDCCH corresponding to the largest cell index among the PDCCHs.

4. A radio communication method for terminal comprising:
   receiving one or more pieces of downlink control information for scheduling of one or more physical downlink shared channels (PDSCHs);
   when a hybrid automatic repeat request-acknowledgement (HARQ-ACK) information for the PDSCH is transmitted in a slot, determining based on a number of cells used for transmission of the PDSCHs whether or not to use a control channel element (CCE) index for determination of a physical uplink control channel (PUCCH) resource carrying the HARQ-ACK information;
   determining not to use the CCE index for the determination of the PUCCH resource when the number of cells used for transmission of the PDSCHs is more than a value; and
   determining not to use the CCE index for the determination of the PUCCH resource irrespective of a number of the one or more pieces of the downlink control information.

5. A base station comprising:
   a transmitter that transmits one or more pieces of downlink control information for scheduling of one or more physical downlink shared channel (PDSCH); and
   a processor that, when a hybrid automatic repeat request-acknowledgement (HARQ-ACK) information for the PDSCH is transmitted in a slot, controls reception of a physical uplink control channel (PUCCH) using a PUCCH resource carrying the HARQ-ACK information, it being determined based on a number of cells used for transmission of the PDSCHs whether or not a control channel element (CCE) index is used for determination of the PUCCH resource, wherein the CCE index is not used for the determination of the PUCCH resource when the number of cells used for transmission of the PDSCHs is more than a value, and wherein the CCE index is not used for the determination of the PUCCH resource irrespective of a number of the one or more pieces of the downlink control information transmitted by the transmitter.

* * * * *